United States Patent
Almehmadi

(10) Patent No.: US 11,039,075 B1
(45) Date of Patent: Jun. 15, 2021

(54) METHOD AND SYSTEM FOR CONTROLLING DEVICES FOR TRACKING SYNCHRONOUS MOVEMENTS

(71) Applicant: Abdulaziz Mohammed Almehmadi, Tabuk (SA)

(72) Inventor: Abdulaziz Mohammed Almehmadi, Tabuk (SA)

(73) Assignee: University of Tabuk, Tabuk (SA)

( * ) Notice: Subject to any disclaimer, the term of this patent is extended or adjusted under 35 U.S.C. 154(b) by 0 days.

(21) Appl. No.: 17/095,170

(22) Filed: Nov. 11, 2020

(51) Int. Cl.
| | |
|---|---|
| H04N 9/04 | (2006.01) |
| H04N 5/232 | (2006.01) |
| H04N 5/247 | (2006.01) |
| H04N 7/18 | (2006.01) |
| G06F 3/16 | (2006.01) |
| G06K 9/00 | (2006.01) |
| G06T 7/20 | (2017.01) |

(52) U.S. Cl.
CPC .......... H04N 5/23299 (2018.08); G06F 3/16 (2013.01); G06K 9/00335 (2013.01); G06K 9/00362 (2013.01); G06T 7/20 (2013.01); H04N 5/247 (2013.01); H04N 7/181 (2013.01)

(58) Field of Classification Search
CPC ..... A61B 5/11; A61B 5/0077; A61B 5/02028; A61B 5/0205; A61B 5/024; A61B 5/02405; A61B 5/029; A61B 5/0816; A61B 5/087; A61B 5/091; A61B 5/1123; A61B 5/163; A61B 5/165; A61B 5/4803; A61B 5/6891; A61B 5/6893; A61B 5/7282
USPC .......................................... 348/207; 726/25
See application file for complete search history.

(56) References Cited

U.S. PATENT DOCUMENTS

2003/0218672 A1* 11/2003 Zhang ...................... H04N 7/15
    348/14.16
2009/0243844 A1* 10/2009 Ishidera ........... G08B 13/19615
    340/540

(Continued)

OTHER PUBLICATIONS

I. Serrano, O. Deniz, J. L. Espinosa-Aranda and G. Bueno, "Fight Recognition in Video Using Hough Forests and 2D Convolutional Neural Network," in IEEE Transactions on Image Processing, vol. 27, No. 10, pp. 4787-4797, Oct. 2018, doi: 10.1109/TIP.2018.2845742.

(Continued)

*Primary Examiner* — Masum Billah
(74) *Attorney, Agent, or Firm* — Reichel Stohry Dean LLP; Natalie J. Dean

(57) ABSTRACT

Devices, systems and methods for controlling cameras, by processing recorded image frames to record head orientations corresponding to head objects identified for individuals in image frames over a first duration of time, and determining based on the head orientations: (i) an amount of synchronous alignment in the head objects in a new direction within a threshold range of angles, (ii) a rate of change in the one or more extracted head orientations towards the new direction, and (iii) a second duration of time in which re-orientation of the head objects begins and ends in the new direction; controlling an orientation of one camera to move to a field of view corresponding to the new direction. In alternate embodiments, the system may conduct further detection processes and generate further stage alerts thereby increasing the system confidence in the new camera direction.

20 Claims, 8 Drawing Sheets

(56) References Cited

U.S. PATENT DOCUMENTS

2018/0341814 A1* 11/2018 Li .................... G08B 13/19613
2019/0356885 A1* 11/2019 Ribeiro .................... G06T 7/70

OTHER PUBLICATIONS

M. Perez, A. C. Kot and A. Rocha, "Detection of Real-world Fights in Surveillance Videos," ICASSP 2019—2019 IEEE International Conference on Acoustics, Speech and Signal Processing (ICASSP), Brighton, United Kingdom, 2019, pp. 2662-2666, doi: 10.1109/ICASSP.2019.8683676.

A. Mumtaz, A. B. Sargano and Z. Habib, "Violence Detection in Surveillance Videos with Deep Network Using Transfer Learning," 2018 2nd European Conference on Electrical Engineering and Computer Science (EECS), Bern, Switzerland, 2018, pp. 558-563, doi: 10.1109/EECS.2018.00109.

S. A. Carneiro, G. P. da Silva, S. J. F. Guimaraes and H. Pedrini, "Fight Detection in Video Sequences Based on Multi-Stream Convolutional Neural Networks," 2019 32nd SIBGRAPI Conference on Graphics, Patterns and Images (SIBGRAPI), Rio de Janeiro, Brazil, 2019, pp. 8-15, doi: 10.1109/SIBGRAPI.2019.00010.

Ş. Akti, G. A. Tataroğlu and H. K. Ekenel, "Vision-based Fight Detection from Surveillance Cameras," 2019 Ninth International Conference on Image Processing Theory, Tools and Applications (IPTA), Istanbul, Turkey, 2019, pp. 1-6, doi: 10.1109/IPTA.2019.8936070.

S. Loganathan, G. Kariyawasam and P. Sumathipala, "Suspicious Activity Detection in Surveillance Footage," 2019 International Conference on Electrical and Computing Technologies and Applications (ICECTA), Ras Al Khaimah, Jnited Arab Emirates, 2019, pp. 1-4, doi: 10.1109/ICECTA48151.2019.8959600.

H. Jain, A. Vikram, Mohana, A. Kashyap and A. Jain, "Weapon Detection using Artificial Intelligence and Deep Learning for Security Applications," 2020 International Conference on Electronics and Sustainable Communication Systems (ICESC), Coimbatore, India, 2020, pp. 193-198, doi: 10.1109/ICESC48915.2020.9155832.

R. Kakadiya, R. Lemos, S. Mangalan, M. Pillai and S. Nikam, "AI Based Automatic Robbery/Theft Detection using Smart Surveillance in Banks," 2019 3rd International conference on Electronics, Communication and Aerospace Technology (ICECA), Coimbatore, India, 2019, pp. 201-204, doi: 10.1109/ICECA.2019.8822186.

C. V. Amrutha, C. Jyotsna and J. Amudha, "Deep Learning Approach for Suspicious Activity Detection from Surveillance Video," 2020 2nd International Conference on Innovative Mechanisms for Industry Applications (ICIMIA), Bangalore, India, 2020, pp. 335-339, doi: 10.1109/ICIMIA48430.2020.9074920.

A. Singh, K. Kiran G.V., O. Harsh, R. Kumar, K. Singh Rajput and C. S .S. Vamsi, "Real-Time Aerial Suspicious Analysis (ASANA) System for the Identification and Re-Identification of Suspicious Individuals using the Bayesian ScatterNet Hybrid (BSH) Network," 2019 IEEE/CVF International Conference on Computer Vision Workshop (ICCVW), Seoul, Korea (South), 2019, pp. 73-81, doi: 10.1109/ICCVW.2019.00015.

L. Yu, D. Zhang, X. Chen and A. Hauptmann, "Traffic Danger Recognition With Surveillance Cameras Without Training Data," 2018 15th IEEE International Conference on Advanced Video and Signal Based Surveillance (AVSS), Auckland, New Zealand, 2018, pp. 1-6, doi: 10.1109/AVSS.2018.8639166.

Q. Wu, X. Chen, Z. Huang and W. Wang, "Generating Future Frames with Mask-Guided Prediction," 2020 IEEE International Conference on Multimedia and Expo (ICME), London, United Kingdom, 2020, pp. 1-6, doi: 10.1109/ICME46284.2020.9102876.

Y. Kwon and M. Park, "Predicting Future Frames Using Retrospective Cycle GAN," 2019 IEEE/CVF Conference on Computer Vision and Pattern Recognition (CVPR), Long Beach, CA, USA, 2019, pp. 1811-1820, doi: 10.1109/CVPR.2019.00191.

M. Chaabane, A. Trabelsi, N. Blanchard and R. Beveridge, "Looking Ahead: Anticipating Pedestrians Crossing with Future Frames Prediction," 2020 IEEE Winter Conference on Applications of Computer Vision (WACV), Snowmass Village, CO, USA, 2020, pp. 2286-2295, doi: 10.1109/WACV45572.2020.9093426.

A. G. Bors and I. Pitas, "Prediction and tracking of moving objects in image sequences," in IEEE Transactions on Image Processing, vol. 9, No. 8, pp. 1441-1445, Aug. 2000, doi: 10.1109/83.855440.

E. Zolfagharifard, Scared stiff: Scientists discover how the brain sends signals to make us 'freeze' when faced with langer, DailyMail, Apr. 2014, Available at: http://www.dailymail.co.uk/sciencetech/article-2612117/Scared-stiff-Scientists-discover-brain-sends-signals-make-freeze-faced-danger.html.

"TensorFlow Object Detection API", TensorFlow, Available at: https://www.tensorflow.org/lite/models/object_detection/overview Accessed: Jul. 1, 2020.

"Faster RCNN Ppenimages v4 and Inception_Resnet v2" TensorFlow hub, Available at: https://ffhub.dev/google/faster_rcnn/openimages_v4/inception_resnet_v2/1, Accessed: Jul. 5, 2020.

M. J. Marin-Jiménez, V. Ferrari and A. Zissemian, "Head Detector" Visual Geometry Group, Available at: https://www.robots.ox.ac.uk/~vgg/software/headmview/, Accessed: Jul. 10, 2020.

A. Geitgey, "Face Recognition," GitHub, Available at: https://github.com/ageitgeyfface_recognition, Accessed: Jul. 15, 2020.

E. Pranav, S. Kamal, C. Satheesh Chandran and M. H. Supriya, "Facial Emotion Recognition Using Deep Convolutional Neural Network," 2020 6th International Conference on Advanced Computing and Communication Systems (ICACCS), Coimbatore, India, 2020, pp. 317-320, doi: 10.1109/ICACCS48705.2020.9074302.

A. Verma, P. Singh and J. S. Rani Alex, "Modified Convolutional Neural Network Architecture Analysis for Facial Emotion Recognition," 2019 International Conference on Systems, Signals and Image Processing (IWSSIP), Osijek, Croatia, 2019, pp. 169-173, doi: 10.1109/IWSSIP.2019.8787215.

P. Kaviya and T. Arumugaprakash, "Group Facial Emotion Analysis System Using Convolutional Neural Network," 2020 4th International Conference on Trends in Electronics and Informatics (ICOEI)(48184), Tirunelveli, India, 2020, pp. 643-647, doi: 10.1109/ICOEI48184.2020.9143037.

M. M. Taghi Zadeh, M. Imani and B. Majidi, "Fast Facial emotion recognition Using Convolutional Neural Networks and Gabor Filters," 2019 5th Conference on Knowledge Based Engineering and Innovation (KBEI), Tehran, Iran, 2019, pp. 577-581, doi: 10.1109/KBEI.2019.8734943.

I. Lasri, A. R. Solh and M. E. Belkacemi, "Facial Emotion Recognition of Students using Convolutional Neural Network," 2019 Third International Conference on Intelligent Computing in Data Sciences (ICDS), Marrakech, Morocco, 2019, pp. 1-6, doi: 10.1109/ICDS47004.2019.8942386. Network.

R. Pathar, A. Adivarekar, A. Mishra and A. Deshmukh, "Human Emotion Recognition using Convolutional Neural Network in Real Time," 2019 1st International Conference on Innovations in Information and Communication Technology (ICIICT), Chennai, India, 2019, pp. 1-7, doi: 10.1109/ICIICT1.2019.8741491.

V. Tümen, Ö. F. Söylemez and B. Ergen, "Facial emotion recognition on a dataset using convolutional neural network," 2017 International Artificial Intelligence and Data Processing Symposium (IDAP), Malatya, 2017, pp. 1-5, doi: 10.1109/IDAP.2017.8090281.

A. Jaiswal, A. Krishnama Raju and S. Deb, "Facial Emotion Detection Using Deep Learning," 2020 International conference for Emerging Technology (INCET), Belgaum, India, 2020, pp. 1-5, doi: 10.1109/INCET49848.2020.9154121.

G.A. R. Kumar, R. K. Kumar and G. Sanyal, "Facial emotion analysis using deep convolution neural network," 2017 International Conference on Signal Processing and Communication (ICSPC), Coimbatore, 2017, pp. 369-374, doi: 10.1109/CSPC.2017.8305872.

J. Babajee, G. Suddul, S. Armoogum and R. Foogooa, "Identifying Human Emotions from Facial Expressions with Deep Learning," 2020 Zooming Innovation in Consumer Technologies Conference (ZINC), Novi Sad, Serbia, 2020, pp. 36-39, doi: 10.1109/Z1NC50678.2020.9161445.

\* cited by examiner

FIG. 5

METHOD AND SYSTEM FOR CONTROLLING DEVICES FOR TRACKING SYNCHRONOUS MOVEMENTS

FIELD

Embodiments of the present disclosure relate to the field of security systems, and more specifically, embodiments relate to devices, systems and methods for improved use of synchronous head movement for a crowd behavior-based security system.

INTRODUCTION

Closed-circuit Television (CCTV) system technology become more widely available in the 1940's. The technology has been in constant development in terms of improved resolutions, fields of view, frames per second, among others. However, if an incident takes place outside of the range or field-of-view of a CCTV system, the CCTV system still fails to detect and report it as the CCTV system is unable to see the incident.

This is a deficiency in existing systems as they are not using all available information to maximize coverage and utility of their monitoring abilities.

SUMMARY

Cameras have transformed from being visual and audio recording machines for security personnel to monitor incidents to become smart CCTV and surveillance systems that can understand a situation and report it to security personnel or take an immediate action to rectify it. The advancements in AI and specifically deep learning made it possible for surveillance systems to detect fighting, an abandoned suitcase in an airport, or possession of a weapon, a robbery taking place and tracking of thieves, and suspicious activity to predictive systems that can predict a car accident, the next few seconds of movement, among others.

However, if an incident (e.g., visual or auditory) takes place outside of the range (e.g., a field of view) of the CCTV system, the CCTV system still fails to detect it and report it. While many CCTV systems have static fields of view due to their configuration, some CCTV systems are capable of controlled movement, and can be configured for manual control or movement across a pre-set path (e.g., patrol left and right across a range of 45 degrees).

As described in various embodiments herein, individuals' reactive behavior in response to internal or external stimulus, whether visual, auditory, gustatory, olfactory, cutaneous, kinesthetic or vestibular that is based on human senses can be fully utilized to infer a possible incident whether taking place or about to take place in a locked geographical area outside of visual frame.

Crowd-based movements can thus be utilized to improve how cameras can be controlled to automatically cause a change to the field of view based on specific automatically detected head movements and re-orientations. However, a technical challenge arises due to false positives.

A synchronous head movement (SHMOV) detection system is proposed as a smart security system that, in some embodiments, may automatically analyze the crowd reactive behavior through object detection, and, for example, in a locked time and location to predict a nearby incident (e.g., security incident) outside of a visual frame, and in some embodiments, move the camera either in the estimated direction of the incident as inferred from the detected head objects, or specifically to cover an estimated position of the incident as extrapolated from the directions in which the heads are looking. Corresponding methods, non-transitory computer readable media (e.g., computer program products affixed to physical storage media) are contemplated. Variant embodiments are also described that are directed to avoiding false positives through a staged alert system whereby different combinations of object detection characteristics (head alignment, heads moving backwards, facial reactions) and other stimuli (e.g., auditory, olfactory, external sensory data) are used to reinforce whether an action should be taken to change a field of view of the camera, or to reinforce whether an alert notification should be generated.

The synchronous head movement (SHMOV) detection system is implemented in the form of a controller device that can be a software module coupled to a hardware camera system. Other variations are possible, such as being provided in the form of a field-programmable gate array, an integrated circuit or a system on a chip coupled to a printed circuit board, among others. Simpler variations are also possible, for example, a microprocessor or special purpose chip for an application-specific integrated circuit. In some embodiments, the system can be retrofit as a controller device (or software module) onto an existing CCTV system to control the actuation of rotations and/or other movements.

The controller device can receive inputs from one or more sensors and/or the plurality of image frames recorded from the camera, and generate control signals that are used to cause a motion of the camera to move the field of view (e.g., rotation, translation, or a combination thereof). For example, motion can be controlled by one or more actuators that control the motion of the camera as it rolls, tilts, pans, and/or yaws (e.g., to rotate the camera towards the event), or a translation along a rail upon which the camera is mounted. In some embodiments, the camera is free to move around on its own (e.g., a camera mounted onto a drone). As the system is able to automatically respond to stimuli, an existing camera system can be retrofit such that "blindspots" where the camera is not pointed towards can be addressed. In some embodiments, where the estimated incident potentially occurred at an estimated position where the camera is not able to cover (e.g., beyond the range of rotation), the camera can track this and submit an alert instead.

The system can also include multiple cameras that operate together. For example, there may be a stationary camera that is fixated on a specific field of view, and coupled to a rotating camera that has a "roving" field of view that is shifted in the direction of an inferred incident. In another embodiment, the camera may be a "roving" camera, set to rotate across a pre-programmed route until the route is overridden by the inference of an incident as described in various embodiments herein. In this situation, one camera is designated a primary camera and the other camera can be designed as a secondary camera. Where there is a primary and a secondary camera, one of the two or more cameras can be selected that has a maximum range of motion for coverage, and the alert/move thresholds may be set lower as the impact of a false positive is lower due to the additional coverage from the other cameras.

The processor of the controller device periodically or continually conducts object detection in the plurality of image frames recorded by the one or more cameras to record (e.g., track) one or more head objects and their associated characteristics (e.g., head orientations, head positioning) that are extracted from the plurality of image frames. The heads themselves can be simplified into head objects and analyzed in a real or near-real time basis to determine whether various alert stages are triggered. Heads can be converted into bounding box regions of interest, and then further transformed into data tuples corresponding to specific characteristics of each head over a period of time (e.g., headid, head size (which may be used as a rough proxy for distance from camera), estimated front of head position, estimated rear of head position, head orientation angle).

Converting the heads into head objects and corresponding bounding box regions of interest significantly simplifies the computational requirements, allowing for the use of lower clock speed microprocessors, as well as less on-board memory, for example. This is particularly useful when retrofitting older CCTV systems whose camera positioning is not controlled by a central data room, but rather, individually controlled (e.g., individually controller units may need to be provisioned). As on-board memory may store a trained machine learning model adapted for head object and characteristic detection (and in some embodiments, mapping of the head objects to estimated positions in a two dimensional plane or a three dimensional space), it is important in some cases to ensure that the computation is sufficiently fast so that real-time or near-real time adjustments to camera positioning can be made.

A challenge with a system that observes the movement of head objects is that false positives are possible as individuals naturally move their heads in the course of regular activities and regular stimuli. It is important to be able to distinguish these regular activities and regular stimuli (e.g., leading to voluntary movements) from surprising or unexpected events that are materially startling enough to cause a number of observable involuntary human responses, which then justify a shift in the field of view of at least one of the cameras so that potentially the surprising or unexpected event can be captured. This is not always possible as the field of view may simply not reach the surprising or unexpected event or it may be obstructed (e.g., event happened behind a wall), but the camera may still be configured to at least attempt to shift it into the field of view, which, for example, may capture secondary actions (e.g., thief attempts to run away and re-enters the field of view). As described herein, experiments were conducted by the Applicant to establish specific configuration approaches that aid in reducing the prevalence of false positives while maintaining a sufficiently useful improved security system.

The processor observes the head orientations as detected by the machine learning model to detect an amount of synchronous alignment in the head objects in a new direction within a threshold range of angles, which can be indicative that the movement is involuntary and confirmed as crowd movement characteristics across a proportion of the head objects in view are tracked over an additional duration of time. This is helpful in distinguishing from voluntary movements (e.g., person is crossing the street to head to the bank) because it is less likely that disparate members of a crowd are all trying to do the same thing. Synchronous alignment, for example, can be established, for example, where a proportion of heads (e.g., 30%, 40%, 50%, 60%, 70%, 80%, 90%, 100%) of individuals in frame synchronously align within a range of movement (e.g., within 35% difference or within a number of degrees of angles, such as 5 degrees). In some embodiments, the level of synchronous alignment can be used as an input in determining whether a staged alert should triggered (e.g., 100% alignment has a stronger inference than 50% alignment). As noted herein, other features of the movement can also be tracked in various embodiments, such as a slight backward movement of the head object soon after the synchronous alignment in the new direction (indicative of an involuntary recoil).

The processor also observes the head orientations to detect the rate of change towards a new direction, and durations of time in which the re-orientation takes place. If these satisfy conditions such as having the time from head start movement to stop below a threshold (e.g., 1000 ms, 1500 ms, 2000 ms) and the rate of change is over a threshold (e.g., 30 degrees a second, 45 degrees a second, 60 degrees a second), an initial/main stage alert can be triggered. Similar to the above, in some embodiments, the re-orientation duration and/or rate of change can be used as an input in determining whether a staged alert should triggered (e.g., 60 degrees a second has a stronger inference than 30 degrees a second).

When a main stage alert is triggered, in some embodiments, at least one of the cameras is controlled to move (e.g., rotate) in the direction indicated by the head orientations in an attempt to move the incident into the field of view. In some embodiments, the camera is configured to continually scan in that direction until the processor, using object detection, determines that there is an anomalous object detected or a specific type of object which is detected (car on fire, person has fallen, person is being assaulted, gun). In other embodiments, the camera extrapolates a rough intersection (e.g., intersection point or intersection cloud) from the head objects and the camera is moved until the field of view either captures the incident/object or has it centered in the field of view. In the drone example, the drone can be programmed to automatically direct itself in the direction of and in the field of view of the rough intersection in an attempt to capture the incident in its field of view.

A main stage alert triggering a movement is particularly useful in cases where there is another camera that maintains observation over the original field of view. In another variation, additional stage alerts are utilized to control whether a movement occurs or not (e.g., to avoid false positives or situations where the camera can be "tricked" into a movement). There are other potential stage alerts described in various embodiments, which may be used in different combinations and not just the permutations described. While in some embodiments the stage alerts are sequential, it is not necessary for all embodiments. Other permutations and combinations are contemplated as different embodiments.

For example, there may be a second stage alert that tracks how long the synchronous alignment is maintained for (e.g., at least 2000 ms). There may be a third stage alert where head "backwards" movements can be tracked during the synchronous alignment, which can be indicative of an involuntary "recoiling" behavior. There may be a fourth stage alert where changes in eye shape objects or changes in facial expression objects corresponding to the head objects trigger the stage alert. There may be a fifth stage alert captured sensor recordings (e.g., audio) are processed to identify one or more changes in a signal amplitude (e.g., an increase in 30% in sound for sound captured a few seconds before the incident relative to after, changes in humidity, smoke levels, temperatures, vibrations, magnetometers).

These stage alerts can be utilized in accordance with sequential logic, in some embodiments, to determine whether the camera should be moved. In some embodiments, the stage alert triggers and/or their underlying head characteristics or movement classifications are instead provided to a trained neural network which generates output data sets indicative of whether a movement should occur. In some embodiments, the controller is adapted to generate a probability of whether the movement should occur based on a number of triggered stage alerts (e.g., 50% for just stage 1, 60% for stage 1+2, or stage 1+3, 70% for stage 1+2+3). If there is an aspect of randomness in the control, it is harder for a malicious user to fool the system.

As a non-limiting example implementation, a parking garage may use a CCTV system to monitor for potential car theft incidents. However, the CCTV system may not have full visual coverage of the entire parking garage, due to the limited number of cameras, limited field of view, among other reasons. If a car theft were to take place in a location outside the view of the CCTV system, it may go undetected by, for example, security personnel or the parking garage staff. This presents a technical problem which a SHMOV based system may solve.

Bystanders may notice strange behavior, for example, a car theft taking place. An intended physical embodiment may be implemented with a CCTV system, where a computer is essential to perform automated continual analysis of the synchronous head movement of said bystanders. In some embodiments, the CCTV system may determine based on the SHMOV of bystanders where the incident is taking place, and position the cameras such that the incident may be in the field-of-view.

Other implementation examples include retrofitting existing traffic cameras mounted in conjunction with a highway or a freeway, which can automatically modify their fields of view through rotation to cover accidents or incidents, and then revert their fields of view when the accident is cleared. A number of stage alerts can be utilized, in some embodiments, to determine how long a camera should linger on the incident before reverting to the original field of view. In another example, in a particularly high crime area of a city, the cameras can be coupled to sensory device such as a gunshot detection system, among others. In another example, the system can be used for a low cost home security system, such as a garage door mounted system that observes a first area (e.g., vehicles parked in the driveway), but can shift to a second area (e.g., living room window) when the images indicate a set of crowd head object movements (e.g., someone broke the living room window).

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures:

FIG. 5 is an exemplary image, illustrative of face landmark points, according to some embodiments.

DETAILED DESCRIPTION

Figure 1A:
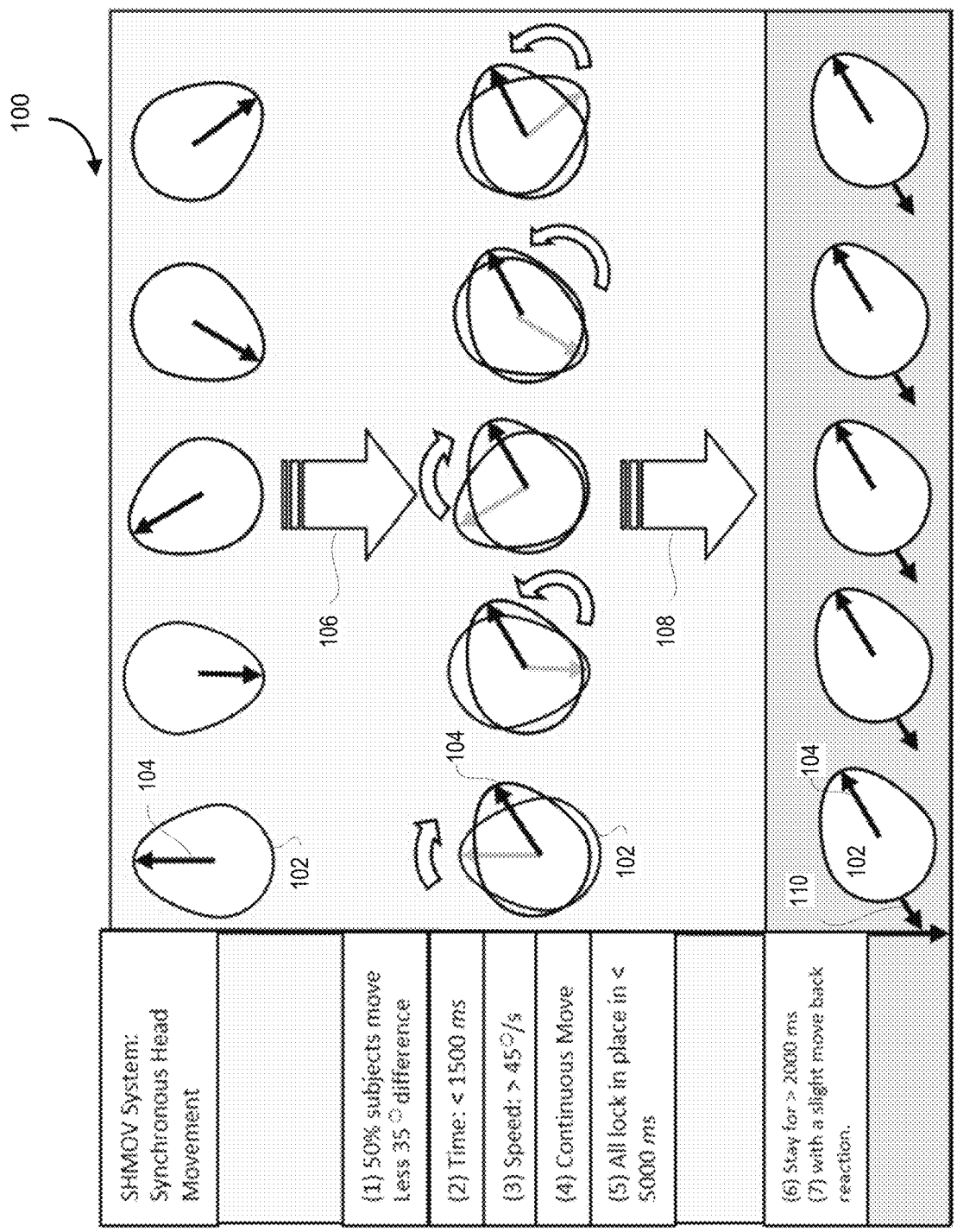
FIG. 1A is a system diagram of head synchronous movement conditions, according to some embodiments.

As described herein, a synchronous head movement (SHMOV) detection system is proposed as a smart security system that, in some embodiments, may automatically analyze the crowd reactive behavior through object detection, and, for example, in a locked time and location to predict a nearby security incident outside of visual frame. Corresponding methods, non-transitory computer readable media (e.g., computer program products affixed to physical storage media) are contemplated.

The approach is a technical solution utilizing object detection across frames of motion that attempt to detect involuntary behaviors associated with head objects of people in a crowd associated with a startling incident that occurs beyond a field of view of the camera. Specific approaches are described in relation to observing object detection based proxy characteristics potentially indicative of certain involuntary actions (e.g., head turning, head recoil, changes in facial features) that are then utilized to generate various alerts or change the field of view of the camera (e.g., towards a new direction or to cover the estimated position of the incident in the field of view).

A staged approach is described in some embodiments to reduce a prevalence of potential false positives (e.g., due to normal movement behavior or malicious attempts to change the field of view). In the staged alert system, different combinations of object detection characteristics (head alignment, heads moving backwards, facial reactions) and other stimuli (e.g., auditory, olfactory, external sensory data) are used to reinforce whether an action should be taken to change a field of view of the camera.

Conventional CCTV systems are passive in nature, requiring human interpretation of video feed to detect security incidents. Although AI advanced CCTV systems to minimize the need for human interpretation including the detection of an action like fighting or an existence of a weapon in scene, none of the previous systems take advantage of the human sensing capabilities to derive inference of a security incident outside of frame. Such sensing capabilities when synchronized by the crowd, present a potential for building a security system that detects the behavior and report if a possible threat is taking place.

When people experience a threat (security incident) in a nearby location, they react simultaneously towards it. The first reaction is mapped to the fight or flight response where people assess the situation by giving it the most attention. The attention is given by locating the source of the threat, moving head towards it, posing for few seconds to assess, eye widening to allow as much information as possible or clench to assess the situation if it is olfactory and a facial expression that expresses the current negative emotion.

When a CCTV smart system is analyzing the crowd head synchronous movement, it is projected that it may be able to utilize the crowd sensing capability and behavior to create an alert to security personnel to take an action even if the incident is out of frame and not collected by the CCTV system.

To address the hypothesis, the following quantitative research objectives were developed: 1) To detect the heads from the video feed of a CCTV camera. Objective 1 addresses the first step of the analysis circuit of the proposed system by drawing a bounding box around individuals' heads. 2) To detect head directions in a 360° range. Objective 2 addresses the second step of the analysis circuit of the proposed system delivering the direction of heads from the video feed allowing for detecting if heads moves are synchronous towards the same direction. 3) To detect the speed of head movement. Objective 3 addresses the third step of the proposed system that is composed of the 5 conditions including delivering the speed, degree per second, and the time for the movement as well as the two seconds pause, and deliver the fourth step of the proposed system of detecting if heads move back while in pause. 4) To detect the eye widening or clenching and emotion of individuals by analyzing their facial expressions during the two seconds pause. Objective 4 delivers the supporting results for the SHMOV system by detecting if eyes widen or clench and if the emotion is (surprise, fear or anger). 5) To detect the microphone sound amplitude deviation level. Objective 5 delivers the deviation level of the sound amplitude prior to the synchronous head move to support the results of the head movement of the proposed system. 6) To evaluate the SHMOV system capability in detecting out of frame incident by analyzing the crowd reactive behavior. Objective 6 delivers the results of the system tests and determines its capabilities in supporting the hypothesis that states that the synchronous head movement of the crowd as a human reactive behavior responding to a nearby incident in a locked geographic location and time presents is a valid metric for detecting out of frame incidents supporting the SHMOV system as a system capable of detecting out of frame incidents.

As described herein, the devices, systems and methods, in some embodiments, are adapted to detect an outside of frame incident by automatically analyzing the crowd reactive behavior that may be triggered by the human sensing capabilities. The devices, systems and methods described herein may provide a crowd behavior-based synchronous head movement (SHMOV) security system, and may provide an out of frame incident detection method using crowd sensing capabilities that result in a reactive behavior. The SHMOV system's accuracy has been evaluated and described in further detail below. An improved, automated security system is described in some embodiments.

FIG. 1A is a diagram 100 of head synchronous movement conditions, according to some embodiments. FIG. 1A depicts the head synchronous movement conditions for a stage 1 alert (main stage alert), as explained below. In FIG. 1A, a series of temporally spaced image frames are processed to extract head objects and their characteristics, for one or more heads visible in the image frames. A simplified illustrative example is shown in FIG. 1A where a number of representative heads are shown for five people in a crowd. A head 102 can have a direction, which can be represented in the form of a directional vector 104 associated with the estimated position of the head. In the first row, as the people in the crowd are each conducting their independent activities, their head objects indicate that they are each facing a variety of directions.

At the outset of an event 106, the five people in the crowd immediately and involuntarily react to an incident or a stimulus that has occurred out of the field of view of the camera. For example, a house has suddenly caught fire due to a kitchen fire. The heads begin to involuntarily re-orient themselves, and synchronize in terms of their alignment in a direction of a kitchen fire. As the kitchen fire and the house on fire may have multiple points of interest, it is not necessary that the heads orient all towards a single point, but rather, they may orient towards a set of points in roughly a similar or same direction. After a duration of time 108, the heads are locked in a direction, for example, in less than 5 seconds, and may include other involuntary movements, such as a recoiling as detected by head objects moving backwards at 110.

In this example, the camera's images may be processed to determine whether an abnormality or an incident artifact is in the field of view, and in this case, it is determined that the abnormality or an incident artifact is not in the field of view. Based on the characteristics of the detected head objects over a plurality of image frames representing one or more durations in time, the one or more alert conditions may be triggered, which then can be used to control whether a movement signal is sent to an actuator to cause the movement of the camera.

Figure 1B:
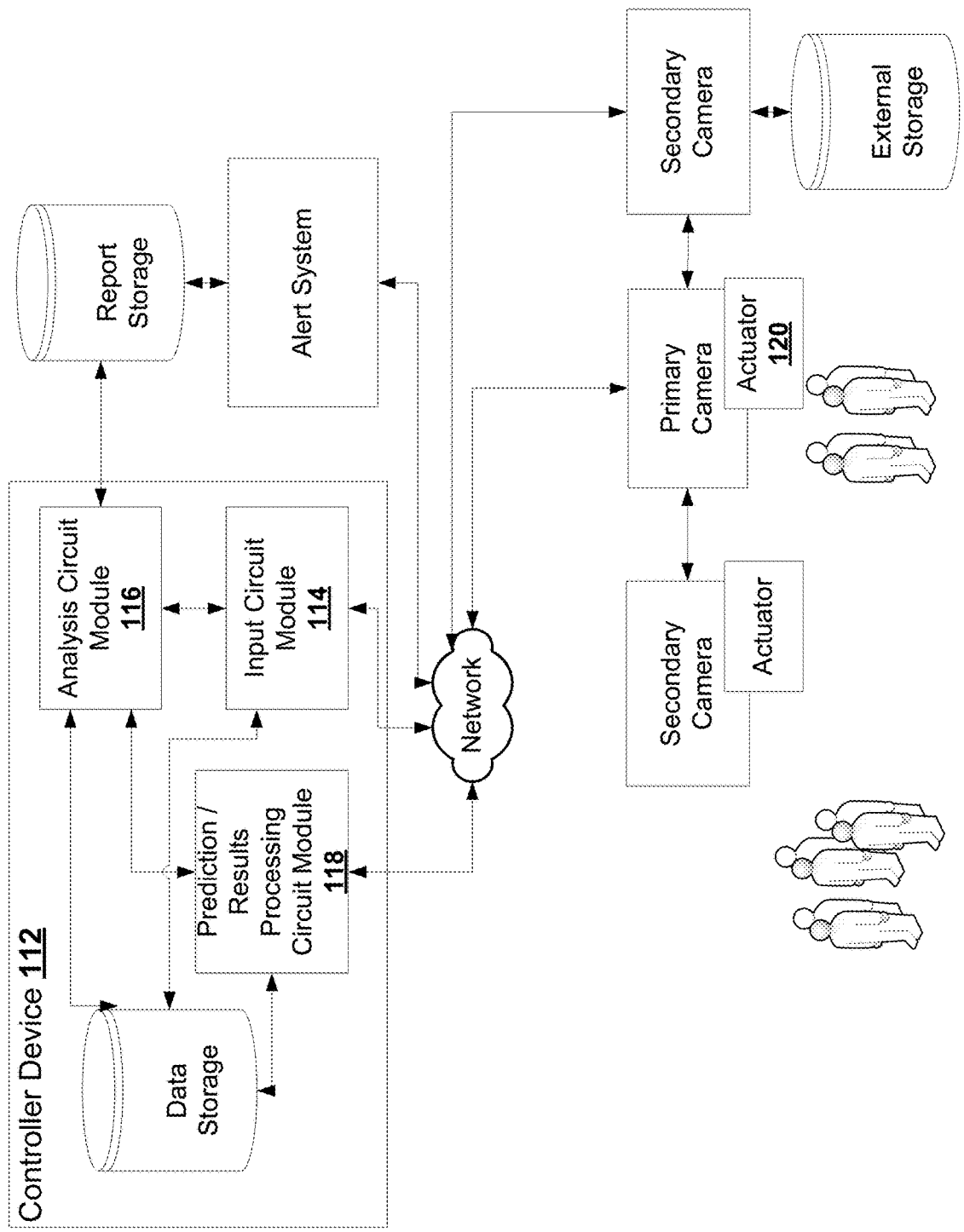
FIG. 1B is a block schematic diagram of a controller device controlling one or more orientations corresponding to one or more cameras, according to some embodiments.

FIG. 1B is a block schematic diagram of a controller device 112 controlling one or more orientations corresponding to one or more cameras, according to some embodiments. The controller device 112 is a synchronous head movement (SHMOV) detection system can be a software module coupled to a hardware camera system, or implemented in the form of embedded firmware or computer-readable instructions (e.g., a computer program product). Other variations for implementing controller device 112 are possible, such as being provided in the form of a field-programmable gate array, an integrated circuit or a system on a chip coupled to a printed circuit board, among others. Simpler variations are also possible, for example, a microprocessor or special purpose chip for an application-specific integrated circuit. The input circuit 114 may, in some embodiments, include sensors for gathering information, two cameras and a microphone.

The input circuit 114 requirement for the camera can be that the camera is be able to record at least 30 frames/second and may be for the microphone to have a 5 Hz-30,000 Hz frequency response range and to be polar response and to be omnidirectional to capture sound from all areas surrounding the microphone. Other types of cameras and microphones are contemplated as well. The analysis circuit 116 can include a smart system described herein for analyzing the crowd behavior for reporting a potential incident and location of said potential incident. The results circuit 118 may deliver the analysis report of the out of frame potential incident that is taking or about to take place and the confidence level for an automated action like moving the camera towards the head directions or providing an alert to security personnel. The input circuit 114, analysis circuit 116, results circuit 118 are not necessarily circuits and in some embodiments can be software modules affixed as instruction sets on non-transitory computer readable media.

The controller device 112 is configured to track main stimulus responses and secondary stimulus responses relating to the fight, flight and freeze response using the analysis circuit 116. According to Zolfagharifar, fear sharpens the senses and increases the heart rate to provide huge energy to handle or survive a threat. If the threat is high, it can cause a freeze response which is an indication that the brain is being overwhelmed.

The described devices, systems and methods utilize the sharpened senses and the synchronous movement of individuals in the frame and the freeze response to detect a potential out of frame threat. Computer implemented determinations and machine learning approaches are utilized to track human head characteristics that are utilized as a computational proxy to track the fight, flight and freeze response. If sensors and human senses are in place, utilized together with the advancements in deep learning technology, the controller device 112 can be utilized to build advanced security solutions. Thus, the security system described herein, based on crowd similar behavior of synchronous head movement (SHMOV).

Embodiments described herein introduce a crowd behavior-based synchronous head movement (SHMOV) system that incorporates controller device 112, the system which may be a smart CCTV system that allows for detecting out of frame incidents by analyzing crowd behavior and specifically head synchronous movement among people as a reaction to an out of frame incident. The system may alert the security personnel of an out of frame incident and the location of the incident, where the heads may be directed. In this embodiment, the security personnel can receive an indication that the security camera should be shifted, and may, in some embodiments, manually cause the movement (e.g., by approving the suggested movement in the corresponding direction), or reject the suggested movement. In another embodiment, the system can generate an alert that automatically moves the camera if the suggested movement is not rejected within a certain time frame (e.g., 2 seconds after notification). The alert, for example, can be an audible alert, a graphical alert (e.g., causing the rendering of an interactive graphical component on a corresponding display of a device or application adapted for controlling cameras).

The controller device 112 provides the alert of a possible security incident, if synchronous head movement occurs among a crowd in a specific area by analyzing the video stream from a camera. The controller device 112 can receive input data sets from input circuit 114 (the input circuit coupled to one or more sensors and/or the camera recording the plurality of image frames), and process the input data sets using analysis circuit 116 that is configured for head detection and condition detection to trigger one or more stage alerts that are then utilized to control a results circuit 118.

The input data sets can be received in various forms, for example, in the forms of sequential image frames, as a multimedia container format containing video and/or audio (e.g., AVI) and other metadata (e.g., time codes), among others. The input data sets can include auditory data (e.g., microphone sound amplitude measurements), as well as data from other sensors (e.g., thermometer, barometer). The input circuit 114 requirements for the camera, for example, may be that the camera is able to capture at least 30 frames/second and may be for the microphone to have a 5 Hz-30,000 Hz frequency response range and to be polar response and is omnidirectional to capture sound from all areas surrounding the microphone.

The analysis circuit 116, in some embodiments, can be configured to simplify and extract head object information from the input data sets. The ability to detect heads as objects utilizing deep learning technology then detect head direction and speed of head movement is investigated in embodiments described herein.

The analysis circuit 116 may be composed of a smart system for analyzing the crowd behavior for reporting a potential incident and location of said potential incident. The analysis circuit 116, in some embodiments, may start by continuously capturing a video stream from the first camera and capturing the sound from the microphone.

The video stream may then analyzed continuously by: detecting the heads in frame by applying head-based object detection using convolutional neural network that draws a bounding box around the individuals' heads separately, and determining the head direction in a 360° radius for all individuals in frame continuously.

It is hypothesized that when people synchronously move their heads from various directions to be locked in one direction in a predefined speed and time, then a security incident may be taking place outside of the visual frame. The system accuracy of analysis circuit 116 may be evaluated by introducing, for example, an accompanying deviation of sound metric as well as facial expressions that occurs while the detected synchronous head movement take place in a stage alert approach where each stage if triggered increases the probability of an incident taking place. Other variations are possible.

As described in various embodiments herein, the head object information can be obtained using trained machine learning models that are adapted for object detection in the image frames, and the head objects themselves can be simplified to reduce the difficulty of computation and improve an ability to conduct real-time or near-real time control of camera operation.

The machine learning models can reside in the analysis circuit 116 in some embodiments as a predictor software or hardware module, or, in some embodiments, can be coupled to the analysis circuit 116 and updated over time (either continuously or in batch, for example, in a firmware update). The analysis circuit 116, upon raising one or more alert conditions, generates one or more output data sets which are then provided to the results circuit 118. The results circuit 118 is configured to process the output data sets of the analysis circuit 116 to determine an amount and/or type of alert conditions being raised, and then responsive to the permutation or combination of alert conditions, the results circuit 118 generates control signals that are used to cause a motion of the camera to move the field of view (e.g., rotation, translation, or a combination thereof).

For example, motion can be controlled by one or more actuators 120 that control the motion of the camera as it rolls, tilts, pans, and/or yaws (e.g., to rotate the camera towards the event), or a translation along a rail upon which the camera is mounted. In some embodiments, the camera is free to move around on its own (e.g., a camera mounted onto a drone).

Where more than one cameras are utilized together that have overlapping fields of view (e.g., the crowd remains in view of at least one camera), the results circuit 118 may be configured to cause a camera motion at a lower threshold of alert conditions. Conversely, when there is only one camera whose field of view is currently covering the crowd, the results circuit 118 may be configured to require a higher threshold of alert conditions before moving the camera (e.g., to avoid situations where the camera is actively fooled by the crowd working together to turn their heads in concert, or coincidental motions of unrelated people, or a non-startling incident, such as observations of a street performer). In some embodiments, the number of alert conditions are utilized to determine when an alert should also be generated, even if no incident is observed when the camera is moved to the updated field of view. In some embodiments, the camera is moved as long as a main stage alert, or any stage alert is triggered.

In another variation, the results circuit 118 may be configured to modify a threshold of alerts based on the number of people in the crowd. In this example, if there are less people in the crowd, there may be a higher threshold of alert conditions required, and vice versa. The rationale for this modification is that it is more difficult to coordinate the head movements of a larger crowd (e.g., a crowd of fifty people at a shopping mall) as opposed to a smaller crowd (e.g., two individuals walking on the street).

In another variation, the results circuit 118 may be configured to only generate a report when the camera that is moved to the updated field of view fails to observe an incident taking place (e.g., the incident took place hidden from the camera, for example, obstructed by a building).

The results circuit 118 may deliver the analysis report of the out of frame potential incident that is taking or about to take place and the confidence level for controlling an automated action including moving the camera towards the head directions or providing an alert to security personnel. In some embodiments, the results circuit 118 generates control signals for controlling an actuator for moving the camera towards the head directions or towards a predicted incident location.

These control signals can include actuating a switch, generating control voltages to one or more motors, etc. The control signals then cause the actuator to effect the motion, for example, by causing a rotational effect of a rotary actuator, among others. The rotational effect may be temporary in some embodiments, for example, the results circuit 118 may be configured to revert the direction of the camera following a period of time back to the initial field of view. In some embodiments, the duration of time in the updated field of view is based on the number of threshold alerts that have been triggered (e.g., two seconds per threshold alert). In some embodiments, the duration of time is determined by the type and/or severity of incident detected in the image frame (e.g., by a machine learning classification mechanism).

In operation, the input circuit 114, analysis circuit 116 and results circuit 118 perform steps of a method including, but not limited to, process a plurality of image frames recorded by one or more cameras to record one or more head orientations corresponding to head objects identified for a plurality of individuals in the plurality of image frames over a first duration of time represented in the plurality of image frames; determining, from the one or more extracted head orientations, (i) an amount of synchronous alignment in the head objects in a new direction within a threshold range of angles, (ii) a rate of change in the one or more extracted head orientations towards the new direction, and (iii) a second duration of time in which re-orientation of the head objects begins and ends in the new direction; and responsive to the amount of synchronous alignment in the head objects in a new direction, the rate of change in the one or more extracted head orientations towards the new direction, and the second duration of time in which the re-orientation of the head objects begins and ends in the new direction, controlling an orientation of at least one camera of the one or more cameras to move a field of view corresponding to the at least one camera in the new direction.

Referring back to FIG. 1A, the controller device 112 may establish a main stage alert if the following conditions (or various combinations or permutations of the below) are detected:

i. The head directions for at least 50% of individuals in frame synchronously align with a maximum of 35% difference, and ii. The time from head start movement to stop is below 1500 ms, and iii. The speed of change towards the new direction is over 45°/second, and iv. The movement is a continuous move without changing angles, and v. All crowd movements from start to stop is in less than 5000 ms.

The above five conditions may represent an incident occurring out of frame that people noticed and reacted to by giving it more attention, which informs the SHMOV system about an incident occurring and the direction of where it is occurring, heads direction. The numbers in the conditions above represent one non-limiting example and may, in some embodiments, be tweaked to reduce false positives.

Other variations are possible. For example, the number of head directions can be modified, the duration of time for the movements can be modified, rate of change can be modified, among others. A balanced weighting is also possible where, for example, an overall contribution is tracked (e.g., a rate of change of 60°/second of the synchronously aligned heads may trigger an alert even if only 30% of individuals in the frame synchronously align). In another variation, a weighting can be applied to heads that are closer to an inferred incident—for example, if a direction is established for the synchronous movement, heads closer (e.g., proximal along an axis of the direction) can be weighted more and heads further (e.g., lateral along the axis of the direction) can be weighted less.

Each condition strengthens the probability and reduces false positives. For instance, the more conditions which are satisfied, the more the system is accurate, and the system can be tuned to change the triggering conditions which ultimately trigger an alert or a movement command. The above conditions may be arranged by priority and together may explain the required behavior. For example, if heads move towards the same direction but over an hour long time period, then it should not trigger a main stage alert. In some embodiments, continuous movement without changing angles may not be a required condition (i.e., condition 4). It may also be noted that the first condition refers to a newly moved to head position, meaning the heads moved to a new direction and did not enter the frame in that direction. This is done to reduce false positives. For example, people walking in a line, looking in the same direction, should not trigger an alert.

In some embodiments, a camera may first detect the heads by applying object detection for each head in the field of view. The camera may note each head direction by automatically feeding the images of each head into a convolutional neural network, trained to determine head direction. The system may continuously do this, verifying the above 5 conditions, and determining if some or all of them return true. If they return true, a main stage alert may be generated, and as explained further below, the system may continue to check other supporting conditions to reduce false positives.

The system then confirms the alert by detecting if the head's direction stops at the same direction for over 2000 ms and create an additional stage alert. Stage alerts are used to confirm the incident and reduce false positives. They act as confirmation of incident by applying further related conditions. If more conditions are detected, the alert is given a higher degree of confidence.

Further, the system detects if head movement while, in a "at pause" direction moves towards the back for few centimeters. In some embodiments, either the same camera or a second camera captures the facial reaction of people in frame to detect if the eyes widen or clench and detect the current emotion. If eyes widen or clench and a negative emotion (surprise, fear, anger) is detected, an additional two stage alerts can be added in the report data structure to confirm and support results, which can then be used as an input into a classifier to control automatic movement.

In some embodiments, the system may detect backwards movement through object detection components, which detect where the head is and the head direction. If, for example, the pixels of the head move towards the opposite side of the detected direction, the system may note that backwards head movement has occurred. The system may apply pixel tracking and may compare this to the detected direction. If pixel tracking moves on the opposite side of the detected direction, the system may note a backwards move. The system may then calculate the move back by the number of pixels that it moved, and may log that number in the report, which may then be used as an input to a classifier.

Figure 2:
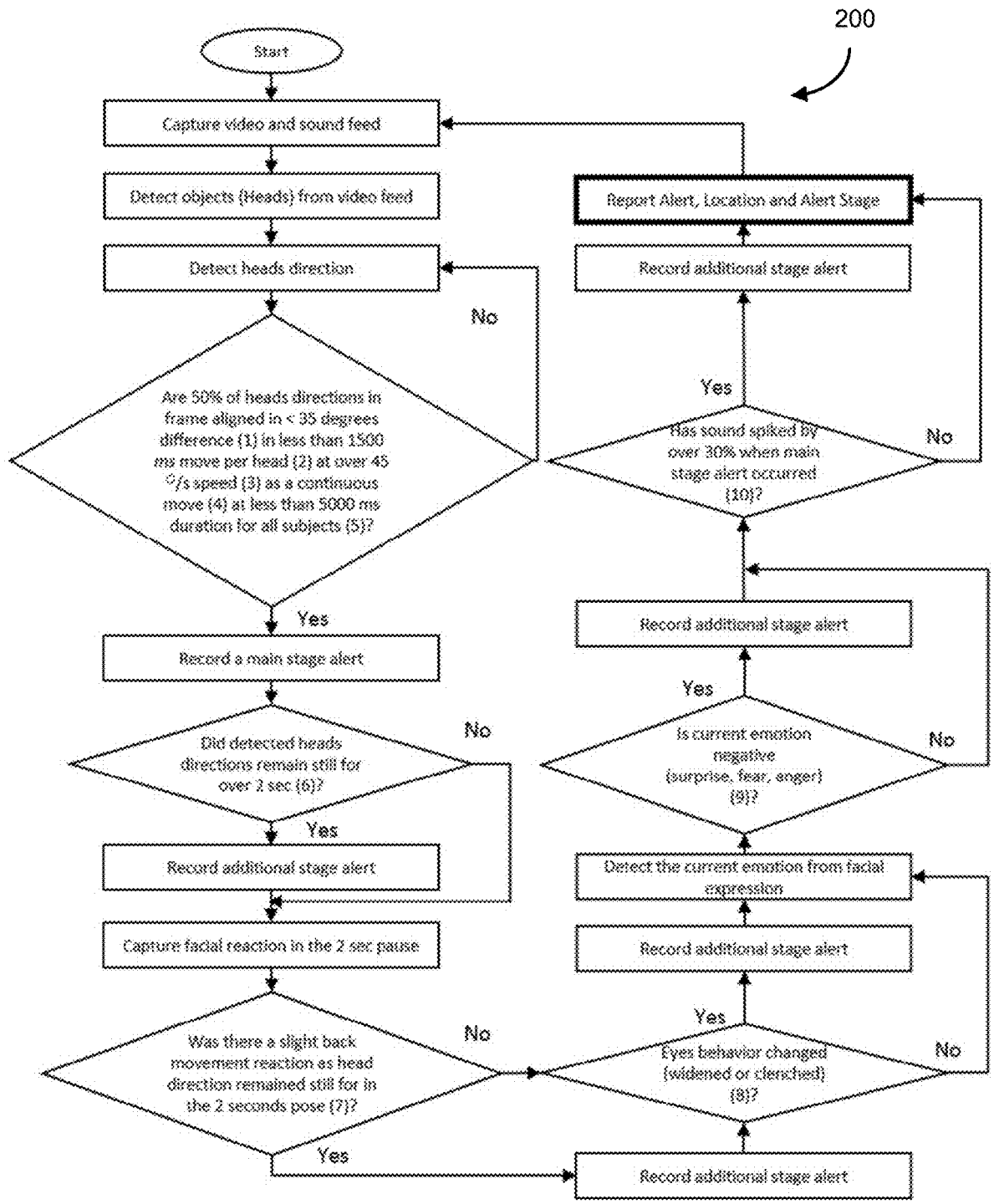
FIG. 2 is a flowchart diagram of the analysis circuit data process, according to some embodiments.

FIG. 2 is a flowchart diagram 200 of the analysis circuit data process, according to some embodiments. The analysis circuit 116 may be composed of a smart system for analyzing the crowd behavior for reporting a potential incident and location of said potential incident. The analysis circuit 116, in some embodiments, may start by continuously capturing a video stream from the first camera and capturing the sound from the microphone, as shown in 200.

The example of FIG. 2 shows a potential set of conditions that trigger various stage alerts, which can be then be utilized to determine whether an incident has actually occurred and whether the cameras should be controlled to change a field of view in at least one camera. It is hypothesized that the synchronous head movement of the crowd as a human reactive behavior responding to a nearby incident in a locked geographic location and time presents is a valid metric for detecting out of frame incidents supporting the SHMOV system as a system capable of detecting out of frame incidents.

As shown in this example, there can be multiple stage alerts, which can then be utilized in various permutations and combinations that are tunable to change how sensitive the system is to various stimuli. Increased sensitivity can lead to increased false positives, which, in some cases may be acceptable (e.g., where there are two or more cameras covering the same field of view such that a false positive does not cause a loss of coverage). In other situations, for example, a retrofit where there is no such redundancy, a higher threshold of alert conditions may be required to cause a change in field of view as the camera will no longer be covering a particular original field of view, but will have an attention shifted to a new field of view.

There are many variations contemplated, where a combination of at least one of the stage alerts are used to trigger the movement. The alerts are not necessarily required in the order shown in FIG. 2, and may be conducted out of order, or in different combinations or with alternate stage alerts. For example, not all implementations will have facial feature recognition abilities. As a specific embodiment, when a main stage alert is triggered, in some variations, the camera is controlled to conduct a shift in a field of view.

In some embodiments, when a main stage alert is generated the camera may move and the system may alert security personnel. The additional stage alerts may be used to reduce false positives if any, and are recorded in the alert report. These percentages may be adjusted, depending on where the system is utilized. An operator may input these percentages and may be required to find an appropriate threshold to reduce false positives and false negatives. For example, in one location a main stage alert may represent 90% certainty, whereas at another location a main stage alert may only represent 40% certainty, thus the system may only trigger camera movement at 65%. The percentages can be dependent on use environment where the system is deployed, such as a train station, underground parking, airport, street, among other locations.

Accordingly, the results circuit 118 is configured to generate a report data structure representative of the out of frame potential incident that is taking or about to take place and the confidence level for an automated action such as moving the camera towards the head directions or providing an alert to security personnel to make a move. The alert stages determine the assurance and confidence of the system that an incident has occurred. In an example, the main stage alert provides a 50% probability of an incident while the supporting five stages increase confidence by 20% when providing the alert report for a total of 100%.

Referring to the flowchart 200, the video stream may be analyzed continuously or periodically, detecting heads in frame and determining the head direction in a 360° radius for all individuals in frame. The heads in frame may, in some embodiments, be detected using a convolutional neural network (CNN) that draws a bounding box around the individuals' heads separately.

The CNN is trained with head images and orientations thereof, and is adapted to track one or more characteristics of the head objects as separate objects. The CNN detects heads if they are in the field of view (e.g., image at t=5.45 s shows 6 heads, transformed into corresponding head object tuples (head size=45 pixels, position of head in frame (x, y), estimated orientation relative to a reference direction=35 degrees, estimated directionality of head=(−5, 4)). The visible characteristics of a head can then be extrapolated to estimate non-visible parts of the head (if the front of the face is visible, the back of the head can be estimated as being directly on the opposite side of the head). There may be tuples directed to facial expressions (e.g., eyes widening, facial clenching), as measured by specific objects detected on the faces (e.g., eye width, facial feature span).

The distance of the head (z) from the camera can be inferred from the head size relative to one or more reference head sizes. For example, a single reference head size can be used for a rough estimation, or multiple reference head sizes (e.g., youth, man, woman, child) can be used for a finer estimation. Accordingly, the position of the head can then be extended to a (x, y, z) coordinate or an equivalent representation (e.g., using cylindrical coordinates, spherical coordinates). Over time, the head tuples can be tracked to determine changes in characteristics. The head size, position, orientation, etc. can be used to establish, over a duration of time, a rate of change, a backwards movement, among others. Furthermore, tuples directed to facial expressions can also be tracked to observe a change (e.g., eye width decreased or increased, facial span grew or shrunk indicative of clenching or an opening of a mouth).

The above five conditions described above which may represent an incident occurring out of frame that people noticed and reacted to by giving it more attention, which informs the SHMOV system about an incident occurring and the direction of where it is occurring, heads direction.

The system may, according to some embodiments, confirm the alert by detecting if the head's direction stops at the same direction for over 2000 ms and create an additional stage alert. Stage alerts are used to confirm the incident and reduce false positives. They act as confirmation of incident by applying further related conditions. If more conditions are detected, the alert is given a higher degree of confidence. Further, in some embodiments, the sound stream analysis from the microphone may be activated and captured, prior to main stage alert by 10 seconds and following the main stage alert by 10 seconds, a total window of 20 seconds. The analysis circuit 116 may report if sound amplitude prior to the head synchronous movement increased by at least 30%, signal deviates significantly. If yes, the system may create a further stage alert and pass the data to the results circuit 118. For example, typically the sound amplitude output is 40 dB, 43 dB, and 39 dB, where the system may determine a baseline (e.g., an average) for the environment. If the sound amplitude increases above the calculated average by 30% or more, then the system may generate an additional stage alert that is related to an incident with sound.

In an alternate embodiment, the processor may be configured to establish a main stage alert if: the amount of synchronous alignment in the head objects for at least 50% of the one or more head orientations synchronously align within the threshold range of 35% difference, the rate of change in the one or more extracted head orientations towards the new direction is over 45 degrees per second, the movement towards the new direction by the head objects is a continuous move without changing angles, the time for each head object movement is within 1500 ms, and an overall time for movement of all the aligned head objects is within 5000 ms.

In another alternate embodiment, the processor may be configured to conduct a second detection step whereby the head objects are tracked to determine whether the synchronous alignment in the head objects is maintained for over 2000 ms, and upon a positive determination, generate a second stage alert, and wherein the main stage alert and the second stage alert are utilized in determining whether the control of an orientation of at least one camera of the one or more cameras to move the field of view should be triggered.

In an alternate embodiment, the processor may be configured to conduct a third detection step whereby the head objects are tracked to determine whether the head objects are moved in a corresponding backwards direction during the 2000 ms, and if the corresponding backwards direction is observed, generate a third stage alert; wherein the third stage alert is also utilized in determining whether the control of an orientation of at least one camera of the one or more cameras to move the field of view should be triggered.

In an alternate embodiment, the processor may be configured to conduct a fourth detection step whereby the plurality of image frames are processed to identify one or more changes in eye shape objects or one or more changes in facial expression objects corresponding to the head objects, based on the changes in one or more changes in eye shape objects or the one or more changes in facial expression objects, generate an fourth stage alert; wherein the fourth stage alert is also utilized in determining whether the control of an orientation of at least one camera of the one or more cameras to move the field of view should be triggered.

In an alternate embodiment, the processor may be configured to conduct a fifth detection step whereby captured audio recordings are processed to identify one or more changes in audio amplitude and, based on the changes in the audio amplitude, generate an fifth stage alert; wherein the fifth stage alert is also utilized in determining whether the control of an orientation of at least one camera of the one or more cameras to move the field of view should be triggered.

In an alternate embodiment, the one or more changes in audio amplitude may be sensed from a coupled microphone adapted to capture sound characteristics prior to the main stage alert for a first duration of time, and to capture sound characteristics after to the main stage alert for a second duration of time, and wherein the fifth stage alert is generated when the sound characteristics during the second duration of time indicate an increase in 30% of sound amplitude relative to the first duration of time.

In respect of reporting the alert, location, and alert stage, a combination of the alerts can be utilized to control to camera to move the field of view. Moving the field of view corresponding to the at least one camera in the new direction may include controlling at least one of pan, tilt, or yaw of the one or more cameras to in the new direction until a recognized incidence object is detected or centered within the field of view.

The head objects may each be associated with a geospatial coordinate ((x, y) or extended to (x, y, z)) and the one or more recorded head orientations are utilized to establish a corresponding vector from the head object towards the re-orientation of the head, and the new direction is established by extrapolating the corresponding vectors from the geospatial coordinates to an intersection point (or a set of potential intersection areas, such as a point cloud). The intersection point may be utilized to determine the control of the orientation of at least one camera of the one or more cameras to move the field of view corresponding to the at least one camera in the new direction such that the field of view includes the intersection point.

Figure 3:
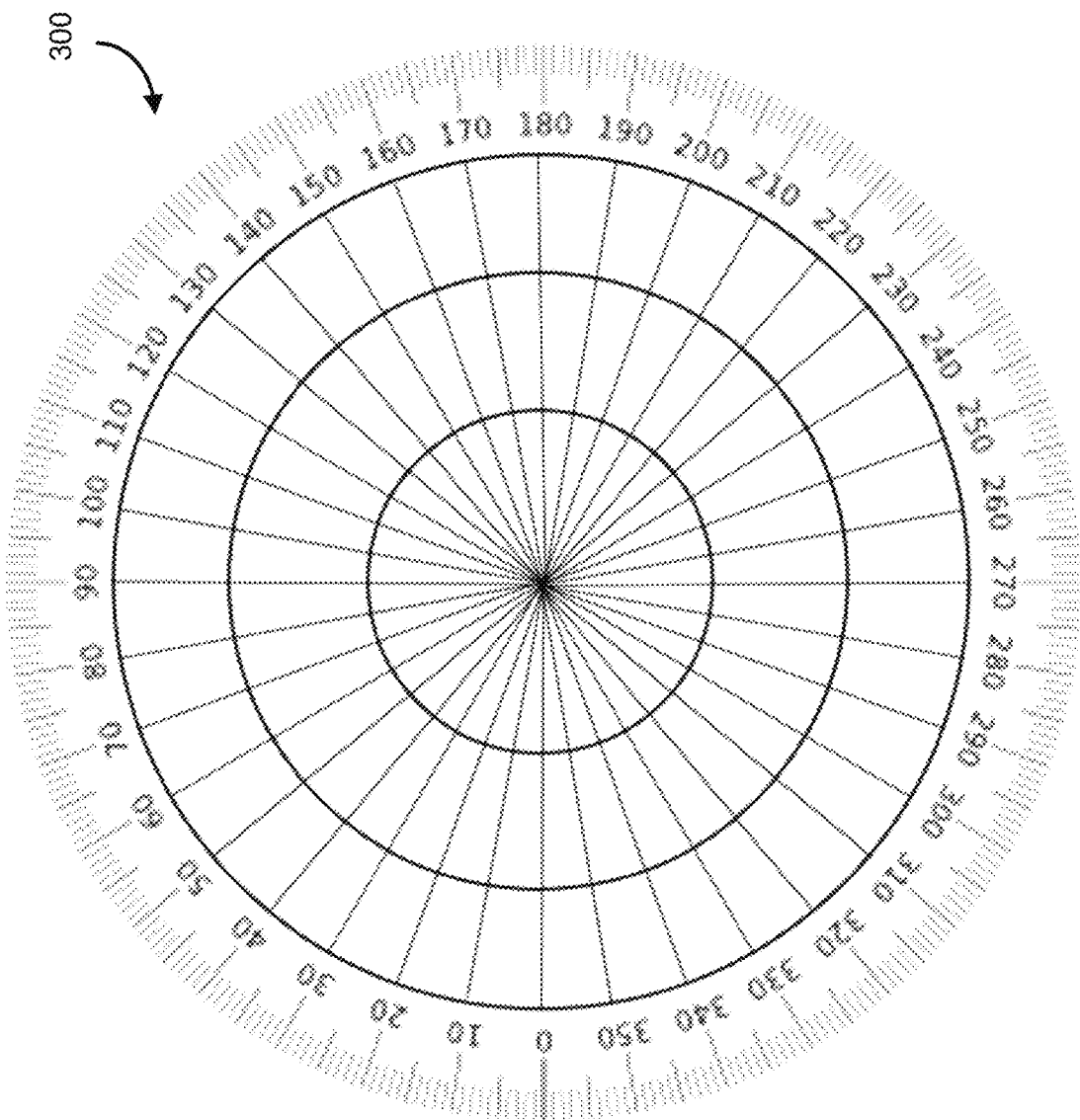
FIG. 3 is an example diagram of 36 direction marks on dataset images, according to some embodiments.

FIG. 3 is an example diagram of 36 direction marks on dataset images, according to some embodiments. Each of the objectives, 1 through 6, are addressed by providing the detailed analysis information that are applied to the experiment data and reporting the results that lead to evaluating the proposed SHMOV security system. Each direction mark shows a difference in 10 degrees.

An embodiment of the proposed SHMOV system using controller device 112 was assessed using an experiment on 20 participants in an auditory, visual and olfactory settings and it indicates the potential of the technology with 100%, 100% and 80% incident detection accuracy in 9, 24 and 47 seconds from the start of incident until controller device 112 reported it in a controlled environment settings respectively.

The experimental results and data analysis were conducted using a non-limiting embodiment of the described system. The results are discussed in further detail below.

The video recordings from the experiment are fed to a convolutional neural network (CNN) to extract the location of heads in the video stream. The CNN was trained using Tensorflow Object Detection API using FasterRCNN and InceptionResNet V2 module with hollywood head dataset for the classifier to be able to detect heads of people in a video feed with the batch size of 10 at 5 epoches and a learning rate of 0.01. The model reached 99% accuracy in detecting heads in a video stream, which achieves Objective 1 that states "To detect the heads from the video feed of a CCTV camera."

Head direction may be detected by training a CNN on top down view of heads in all 36 possible directions in the 360° with a difference of 10° for simplicity purposes. The 36 degrees are 10 to 360 with a 10° increments, as seen in 300. The dataset was built by taking video feed of 5 individuals at each of the 36 directions for a period of 2 minutes per direction per individual, a total of 3600 images per direction, a total of 129,600 images per individual in all 36 directions, a total of 648,000 images for the dataset. The dataset may then be pre-processed and labeled, with the direction, and fed to a FasterRCNN and InceptionResNet V2 module with a batch size of 10 at 5 epochs and a learning rate of 0.01 achieving an 87% accuracy.

In head direction detection, the system feeds the head image in a bounding box to the trained CNN, and it may return the direction in the 360 degrees (or in another type of directionality representation). In some embodiments, training may be done once, and the trained CNN may be used to detect head direction.

In a variant, the images were marked with all 360 degrees, a 360° angle design, as depicted in FIG. 3 and the data set was rebuilt and the system re-trained the FasterRCNN and InceptionResNet V2 with the same parameters. The head direction detection accuracy was improved in this variation to 99%.

In a simplified representation, it is possible to decrease the fine-ness of the angular representation (e.g., down to four directions, eight directions or sixteen directions). A reduced resolution representation is useful in situations where there is very constrained computing power (e.g., the controller device 112 is a low clock speed or reduced computing power microprocessor), such as situations where the controller device 112 is being operated as a battery powered device in a remote location.

The training images can be marked accordingly, and having different resolutions of orientation. However, a reduced representation using a simplified version of 4 directions or 6 will increase false positives. The more accurate the system in detecting the head direction the less false positives the system will have.

Figure 4B:
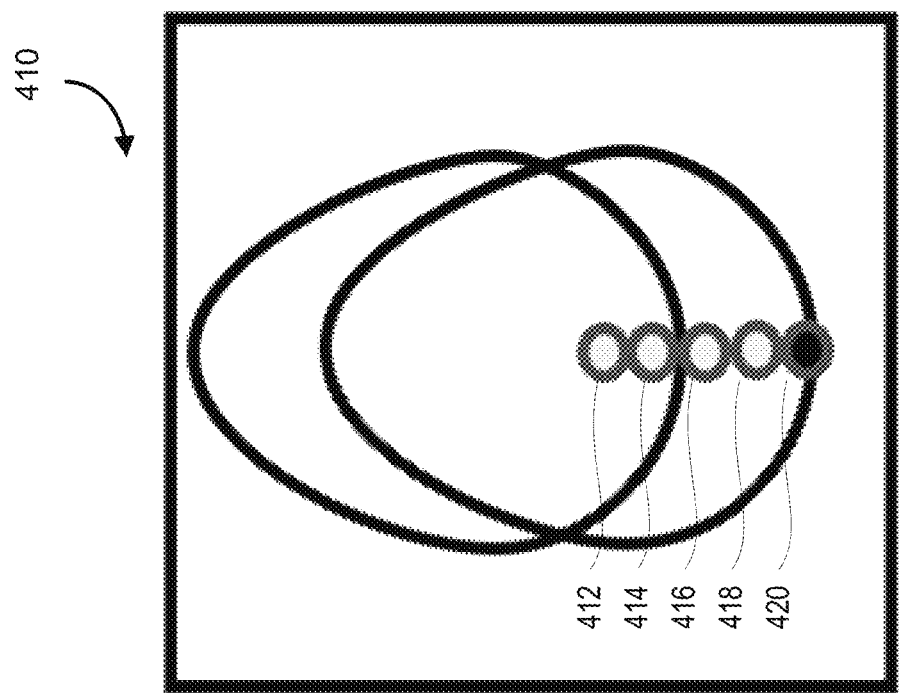
FIG. 4B is an example diagram of head movement, illustrative of a method for performing backward head movement detection, according to some embodiments.
Figure 4A:
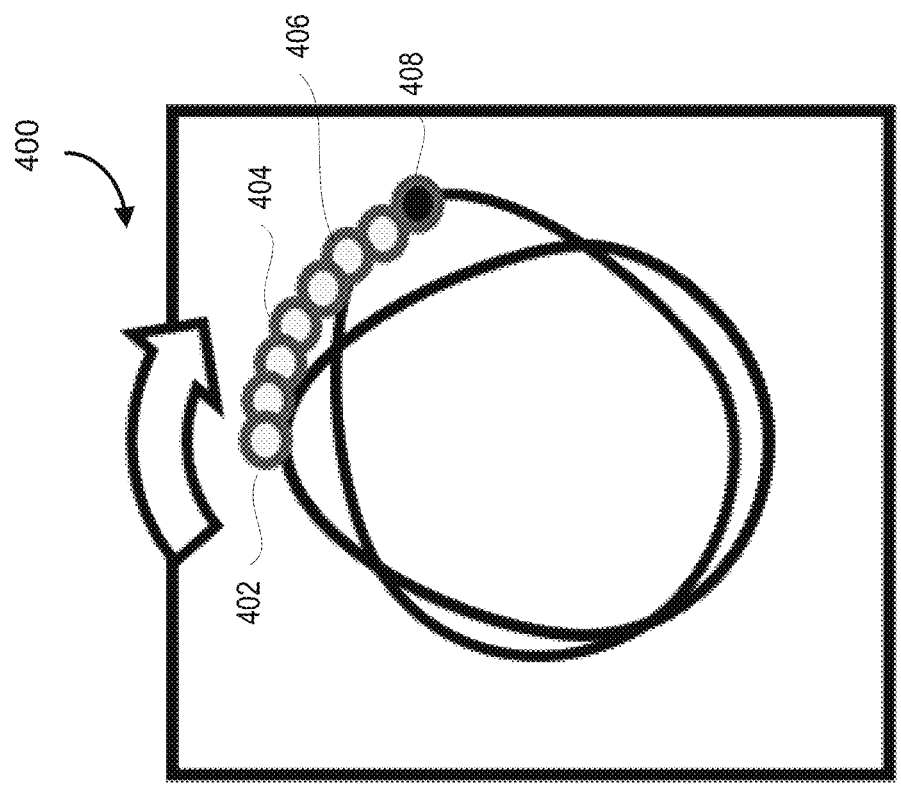
FIG. 4A is an example diagram of head movement, illustrative of a method for performing head movement tracking, according to some embodiments.

FIG. 4A is an example diagram of head movement, illustrative of a method for performing head movement tracking, according to some embodiments. The head movement tracking depicted in 400 may be mapped to 36 direction markers of 300, for extracting the degree of movement. This also achieves Objective 2 that states, "To detect heads directions in a 360° range."

Applied object movement tracking may be applied by tracking the front end of the head per frame to record the movement. In some embodiments, a version having fewer directions may be used, such as 4 or 6 directions, although, this may increase false positives. The more accurate the system may be in detecting head direction, the fewer false positives the system may have.

The head movement speed and time may be detected by analyzing the head direction degree per frame. This achieves Objective 3 that states, "To detect the speed and degree of movement of heads," which allows for detecting the five conditions that form the main stage alert, as described above.

It is important to recognize that for a camera, the images obtained are obtained at a particular perspective of the camera and additional processing steps may be required to convert the heads in the images into a representation as shown in FIG. 4A, and FIG. 4B.

In some embodiments, a machine learning model is applied to the sequential images to transform the camera images into a simplified representation where head object data structures are compared instead. In this example, the images are transformed into head object tuples that may be established in two dimensions or three dimensions as a simplified representation, which is then analyzed to control motion to change the field of view.

In this simplified two-dimensional representation, the camera images are thus converted into a set of heads at specific time steps having positional coordinates (x, y, orientation) relative to the position of the camera (xcamera, ycamera). The change in x, y, and orientations over time can then be used to trigger the main stage alerts based on an inferred incident direction based on the aggregated movements of a proportion of the tracked heads.

For example, in a duration of frames (e.g., 5000 ms), a synchronous alignment is first detected whereby a number of heads (e.g., >50% of the heads in frame) now became oriented towards a new direction based on the head positional coordinates and their corresponding orientations.

The corresponding orientations can be extrapolated to indicate that there is less than a 35 degree difference between what the different heads are observing, for example.

An example chart is shown below in respect of three hypothetical heads and notations regarding movements in respect of a two dimensional plane. More complex examples are possible, including information in respect of microphone sound amplitude captures (even before T=0 s), among others. Even more complex examples are possible where the directionality is established in three dimensions instead of two dimensions, and the camera is rotated in both in terms of an angle and an altitude to either scan in the new direction or to lock in on the intersection (point, centroid, or point area/centroid area) of the head orientations.

| Time | Head 1 | Head 2 | Head 3 | Notes |
| --- | --- | --- | --- | --- |
| T = 0 s | (1, 5, −80 degrees) | (1.4, 5, 150 degrees) | (0.5, 5, −35 degrees) | People clustered near each other but facing different directions, House caught on fire due to stove being left on, loud sound |
| T = 0.5 s | (1, 5, 35 degrees) | (1.4, 5, 70 degrees) | (0.5, 5, 15 degrees) | All heads start turning towards the source of the fire, people are startled |
| T = 1 s | (1, 5, 40 degrees) | (1.4, 5, 60 degrees) | (0.5, 5, 35 degrees) | All heads continue turning towards the source of the fire |
| T = 1.5 s | (1, 5, 41 degrees) | (1.4, 5, 55 degrees) | (0.5, 5, 40 degrees) | All heads continue turning towards the source of the fire, synchronous alignment detected |
| T = 2 s | (0.8, 4.8, 42 degrees) | (1.2, 4.8, 51 degrees) | (0.3, 4.7, 41 degrees) | Heads locked in direction with a slight backwards motion, eyes widen and face span changes |
| T = 2.5 s | (0.75, 4.7, 46 degrees) | (1.1, 4.5, 54 degrees) | (0.2, 4.6, 43 degrees) | Backwards motion continued |
| T = 3 s | (1, 5, 44 degrees) | (1.4, 5, 53 degrees) | (0.5, 5, 43 degrees) | Heads return to original position, locked in new direction |
| T = 3.5 s | (1, 5, 45 degrees) | (1.4, 5, 50 degrees) | (0.5, 5, 40 degrees) | Heads return to original position, locked in new direction |
| T = 4 s | (1, 5, 46 degrees) | (1.4, 5, 51 degrees) | (0.5, 5, 39 degrees) | Heads return to original position locked in new direction |
| T = 4.5 s | (1, 5, 44 degrees) | (1.4, 5, 49 degrees) | (0.5, 5, 41 degrees) | Heads return to original position, locked in new |

-continued

| Time | Head 1 | Head 2 | Head 3 | Notes |
|---|---|---|---|---|
| T = 5 s | (1, 5, 45 degrees) | (1.4, 5, 50 degrees) | (0.5, 5, 40 degrees) | direction Heads return to original position, locked in new direction |

In the above example, the camera may be located at (0, 0), and may be observing an initial field of view from −45 to −15 degrees (it is observing the street). The camera may then establish the new direction (e.g., around 45 degrees, in the direction of the house) from the synchronized heads (if not all heads turned). In some embodiments, the new direction is then utilized as an average of the direction of the heads (or a weighted average if some heads are closer than others) and the camera is controlled to rotate in that direction. In another embodiment, the head directions are extrapolated to establish an intersection point or point cloud (e.g., where they intersect or where they intersect with a predetermined degree of uncertainty). The intersection point or point cloud is easier to assess if the head objects are spaced out spatially. In some embodiments, the controller device 112 is configured to track only a direction if the head objects are clustered together in a same quadrant or portion of the frame at approximately the same distance (it is too difficult to estimate an intersection point with sufficient accuracy), and to track the intersection point or point cloud only where there at least two heads spaced out spatially.

A predetermined degree of uncertainty can be modelled, for example, as a cone that enlarges from the originating head position, and the overlapping areas of the various cones can be used to establish the new direction or the area in which the field of view needs to be shifted to. In some embodiments, in addition to rotating in the direction, the controller device 112 controls the camera to center the field of view at the estimated intersection point or the centroid of where the cones intersect.

For example, in FIG. 4A, when there is a movement of the head object, it can be represented across multiple sequential image frames, as a series of tracked head directions from an initial orientation 402, to intermediate orientation 404, 406, . . . to final orientation 408. Each of these orientations can be represented in the data structure as a rotation angle or vector relative to a reference.

FIG. 4B is an example diagram of head movement, illustrative of a method for performing backward head movement detection, according to some embodiments. In particular, 410 depicts backward detection in head movement in the 2000 ms pause. As shown here, initial back head position 412 can be tracked from the machine vision object detection, with intermediate head positions 414, 416, 418 being observed in sequential frames, with a final head position 420.

A dot may be centered by the back edge of the head inside the bounding box, and the pixel direction changes may be record per frame in the 2 seconds pause after an incident took place, a total of 60 frames (60 locations). The move back reaction may be recorded to determine if it exists using OpenCV, for example.

As a non-limiting example, take a pixel with coordinates (X:250, Y:250), which then moves to (250, 249), followed by a move to (250, 247), then to (250, 245). The system may have 60 inputs within the 2 second pause. If the direction, in this case moving up within the camera frame, given that (0, 0) is the top left corner and head direction is down (i.e. the person is facing the camera), then there is backwards head movement. In another example, a person may be facing right, with movement from (250, 250) to (249, 250), then to (248, 250). The pixels are moving to the left and if the head direction is determined to be facing right then the head is moving back.

If the back of the head is not visible, it can nonetheless be estimated by observing the front of the face and extrapolating a point in the rear of the head as being directly opposite to the front of the face. The size of the face over a period of time can be tracked to determine if the head moved backwards based on an orientation and trajectory of the head (e.g., if the person is facing the camera, the head size shifts from 35 pixels to 32 pixels, indicating a rearwards movement). The head size in combination with the estimated orientation can be used to determine the amount of backwards movement in the axis of the inferred incident direction.

FIG. 5 is an exemplary illustration, illustrative of face landmark points, according to some embodiments. A facial detection library may be used to detect faces in the 2 seconds pause that may be fed to a Face Emotion Recognition (FER) and report the emotion for each participant. Further, eye widening or clenching may be detected using OpenCV.

After detecting the face, the image may be converted to grayscale and detect where the eyes are using the landmark points as depicted in 500, numbers 37-42 for the right eye and number 43-48 for the left eye. A vertical line may be drawn in the midpoint between landmark points 38 and 39 and a point between the landmark points 41 and 42 for the right eye and the same for the left eye. In some embodiments, it may be computed if the line stretches in length (eye widening) or reduces in length (eye clenching).

The line lengths can be tracked over time as part of each of the head data object characteristics. For example, a head data object may be augmented such that the head data object for a particular time includes (timestamp, headid, headsize, headx, heady, lefteyelength, righteyelength, headdirection).

In some embodiments, when computing eye movement, the importance to the system may be to detect change of eye movement. For instance, for eye widening, the system may determine how long the line has become, and for eye clenching, the system may calculate how small the line has become. This may be measured during the 2 second pause and may last at least 1000 ms to avoid blinking (100-300 ms) and reduce false positives. Head objects can be tracked over the period of time by observing rates of changes in the head object data structures.

In this experimental example embodiment, the microphone signal may then be exported to a csv file and preprocessed to include only the prior two head synchronous movement by 10 seconds for 20 seconds if the single includes a positive deviation rate of above 30% change.

The report data structures can include alerts or control in relation to detecting out of frame incident by analyzing the crowd reactive behavior. The data structures includes reports of whether an incident occurs and reports of the correct time and direction of the incident. These face landmark features can be utilized as a proxy to measure eye widening, facial expressions, mouth expressions (e.g., a span of the mouth), which can all be used as inputs into a stage alert that the controller circuit 112 can utilize for determining whether a camera movement should be conducted.

Figure 6:
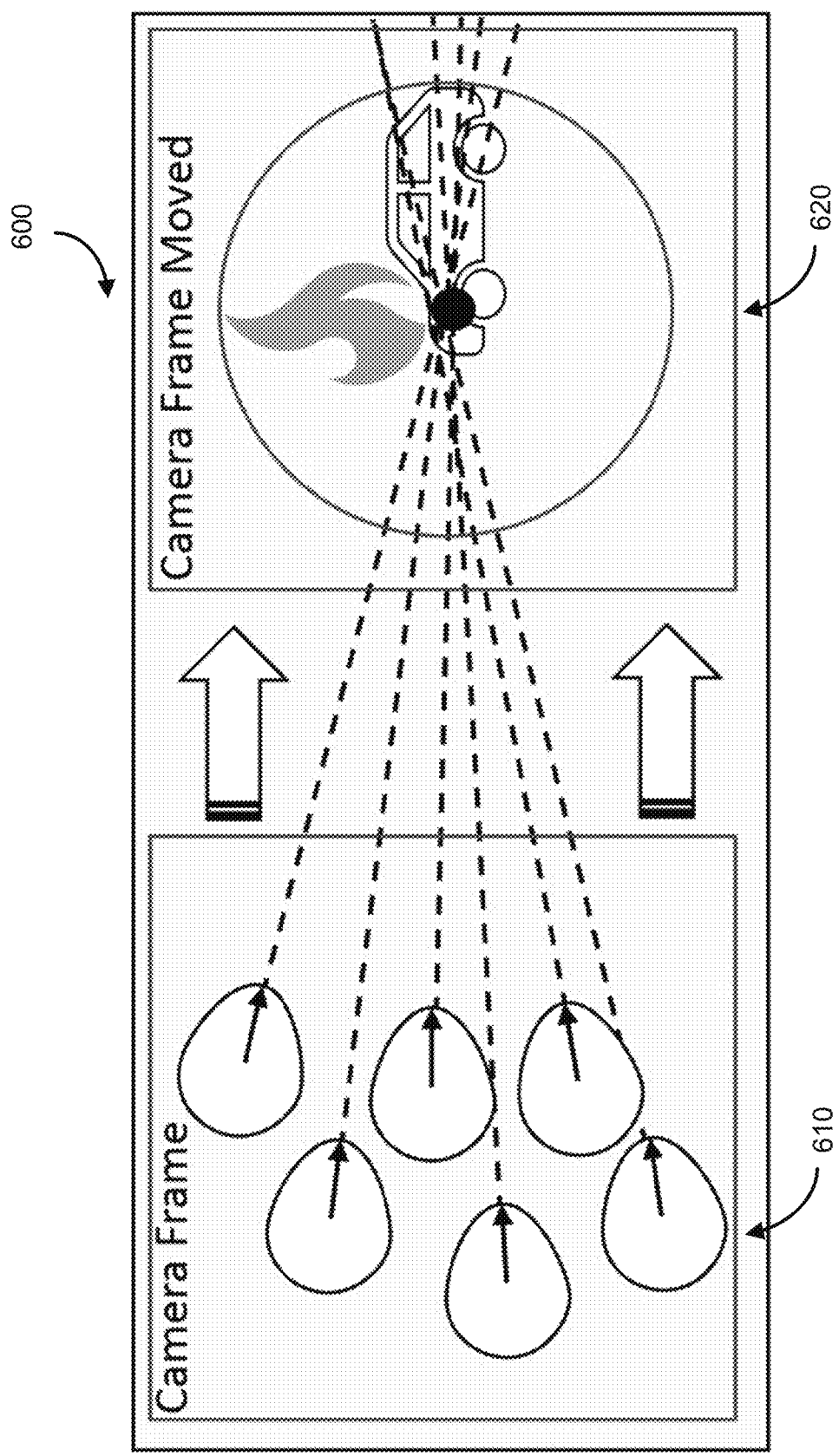
FIG. 6 is a diagram of an example system, illustrative of one potential use-case scenario, according to some embodiments.

FIG. 6 is an example diagram of the system, illustrative of an example potential use-case scenario, according to some embodiments. Diagram 600 demonstrates a potential scenario where SHMOV may be used.

In this non-limiting example, a CCTV system may have six individuals within a camera frame 610. In this example, a car may have caught fire outside of the camera frame. This may prompt the six individuals within frame 610 to, in a synchronous manner, move their heads to observe the car fire. If the appropriate stage alerts are triggered, as described above, the CCTV system camera may pan or move its frame to determine what all six individuals at.

The camera will then automatically determine an intersection point, based on the orientation and direction of the individuals heads, and the system may allow the camera frame to observe the car fire in 620.

For example, in some embodiments, a main stage alert may be generated if at least three of the six individuals in frame 610 synchronously align with a maximum of 35% difference, moving their heads continuously without changing angles from start to stop in less than 1500 ms, with a speed of over 45°/second, and all crowd movements from start to stop are in less than 5000 ms. In other embodiments these numbers may be tweaked to reduce false positives, for example.

These conditions represent an incident is occurring outside of frame. In this scenario, a car fire is taking place outside of frame 610 and in frame 620. People noticed this event and reacted to it by giving the incident more attention. This may inform the SHMOV system provided by controller device 112 of the occurring car fire, and the direction of where it is occurring based on the heads direction.

The controller device 112 may confirm the alert by detecting if the heads direction stops at the same direction for over 2000 ms, and may create an additional stage alert. Further stage alerts may act as confirmation of an incident, in this case a car fire, by applying further related conditions. If more conditions are detected, the alert may be given a higher degree of confidence, and may reduce false positives.

In some embodiments, following the confirmation given by the generation of a main stage alert, additional stage alerts may be generated to send security personnel to the location or to move multiple cameras to the incident location and corresponding locations (paths towards the location, etc.), among other actions. For example, if a car fire occurs and the system detects the reaction and location, a camera may move towards this direction, but if it does not see anything the system may send an alert to the other cameras to move towards the ways leading to the incident location. This may be useful to track moving subjects, for example, if the car on fire were still moving. In some embodiments, the system may instruct one camera to move towards the location based on reactions, while the camera which detected said reactions may move towards a predicted location where the incident might be taking place.

The controller device 112 in some embodiments, may further detect backwards head movement by a few centimeters. A second camera may capture the facial reaction of the individuals to identify a negative emotion such as surprise, fear or anger, by detecting if the eyes widen or clench. If a negative emotion is identified, an additional two stage alerts may be added in the report to confirm and support the results.

The controller device 112 as shown in the example diagram 600 may, in some embodiments, activate the sound stream analysis from a microphone to capture a window of 20 seconds, capturing 10 seconds before and after the detected incident. In this example, the car fire may have made a noise, and if there was a 30% increase in sound amplitude prior to the synchronous head movement, another stage alert may be generated.

The experimental methodology described herein was proposed to address the objectives, as such human experimentation was conducted mainly due to the nature of the study in analyzing human reactive behavior towards an out of frame incident.

A) Experiment Goal:

The main goal of the experiment to collect head movement data of individuals in a locked geographic location that allows for evaluating the proposed system's capability of detecting an out of frame incident.

B) Subjects:

A group of healthy with no allergy 20 participants, male and female, aged between 18-36 years participated in the experiment. As the main goal is to collect head movements, all participants were instructed not to cover their heads during the experiment. All participants volunteered to participate.

C) Procedure:

Participants were asked to read and sign a consent form that stated that a memory test is to take place. They were divided into four groups with 5 participants in each group. Each group of participants were asked to remove anything that covers their heads and asked to get to know each other asking questions about their hometown, favorite sport and travel interests prior to the start of the experiment while the experiment already started without their knowledge.

Two cameras were placed in the experiment room, a camera and microphone were placed on top of their seating area at a 270° angle and a second camera was placed in the direction where people should show a reaction towards, which is used to capture facial reaction, and then started recording. The first 2 minutes were left with no stimuli, then a stimulus or stimuli were presented depending on the group. The stimuli last for 30 seconds to 60 seconds depending on the type of stimulus. Seating were designed in a circular theme, where each participant is facing all others.

Group A were stimulated with loud, 95 dB, music played by a speaker placed by the left side of the camera for 30 seconds.

Group B were stimulated with the experimenter entering the room from the right side of the camera for 30 seconds.

Group C were stimulated with a smell of burned food outside of where participants were seated by the left side of the camera for 60 seconds with a fan directed to the participants location.

Group D were stimulated with both the experimenter entering the room and music from the other direction, left and right, simultaneously for 60 seconds.

Since all locations of incidents are pre-defined, the aim of the experiment in all A, B, C and D groups is to evaluate if the system is capable of determining the moment the incident occurs and the location of where it is occurring using the crowd reactive behavior towards the stimulus. Participants were later informed about the goal of the experiment and asked to sign a consent form to publish the results.

D) Procedure Discussion:

Group A participants were stimulated with an auditory stimulus which simulates gun shots, or a dangerous auditory stimulus while Group B were stimulated with a visual stimulus which simulates a visual incident. Group C were stimulated with an olfactory stimulus which simulates a gas, fire incident; however, the sense of smell usually does not report a specific direction when compared to visual or auditory. Group D were the only group presented with two different stimuli in two opposite directions to evaluate how people behave and how the system reacts in such case. Participants were not informed about the true goal of the experiment in order to simulate a real environment. Participants were seated in a circular theme in order to detect the reactive behavior towards the source of the threat and test it starting from all heads directed to different locations.

E) Test Environment:

To measure the synchronous head movement and test the proposed system, we placed a camera and microphone on top of the seating area of the participants covertly at a 270° angle, pointing down and a second camera pointing towards participants faces when they react towards the stimulus to capture their facial reaction. The cameras capture 30 frames/second and the microphone has a 5 Hz-30,000 Hz frequency response range and is polar in response and is omnidirectional.

Participants were instructed to enter a room that has closed windows and two opposite open doors and select a seat prior to the memory test that will start in few minutes. Then each group were stimulated depending on the group they were assigned. The video and microphone data were recorded and prepared for the analysis phase to address the objectives and test the hypothesis.

Each group A, B, C, and D's data from the experiment were processed by the analysis circuit of the experimental example embodiment of the SHMOV system as per the SHMOV data process for evaluating the proposed system if it is capable of detecting out of frame incidents by analyzing the crowd synchronous head movement.

Group A:

The analysis showed a head movement of all participants in Group A towards the left side, auditory source, in 20° direction difference among participants at an average speed of 80°/s in a 1050 ms as a continuous movement with a 1400 ms move from first participant to last triggering the main stage alert. All participants were locked in place for 5240 ms triggering the additional stage alert and reporting the direction of incident. Next, back movement was detected, and eyes were widened, and emotions were detected to be negative (surprise and fear) triggering the additional three stage alerts. Further, the sound volume increased by 93% triggering the last stage alert at 100%. The duration from stimulus until SHMOV reported the incident and direction of incident is 9 seconds.

Group B:

The analysis showed a head movement of all participants in Group B towards the right side, visual source, in 20° direction difference among participants at an average speed of 70°/s in a 1410 ms as a continuous movement with a 4720 ms move from first participant to last triggering the main stage alert. All participants were locked in place for 8490 ms triggering the additional stage alert and reporting the direction of incident. Next, back movement was detected, and eyes were widened, and emotions were detected to be negative (surprise and fear) triggering the additional three stage alerts. Further, the sound volume increased by 65% triggering the last stage alert at 100%. The duration from stimulus until SHMOV reported the incident and direction of incident is 24 seconds.

Group B were directed by two participant who noticed the experimenter standing by them and her movement reaction triggered the other participants reaction to move their heads towards the experimenter.

Group C: The analysis showed a head movement of three participants in Group C towards the door side, left side (olfactory source), in 30° direction difference among participants at an average speed of 50°/s in a 1486 ms as a continuous movement with a 15450 ms move from first participant to last triggering the main stage alert if omitting the group 1st to last move towards the source due to the nature of the stimulus being olfactory. All participants were locked in place for 2404 ms triggering the additional stage alert and reporting the direction of incident. Next, back movement was not detected, yet eyes were clenched due to the nature of the stimulus being olfactory, and emotions were detected to be negative (surprise) triggering the additional two stage alerts instead of three stage alerts. Further, the sound volume increased by only 22% not triggering the last stage alert leaving the total stage alert at 80%. The duration from stimulus until SHMOV reported the incident and direction of incident is 47 seconds.

Group C were directed by one participant who noticed the smell of food burning her movement reaction triggered the other participants reaction to move their heads towards exit.

Group D: The analysis showed a head movement of all participants in Group D towards the left side, auditory source, and then the right side, the visual source in 20° direction difference among participants at an average speed of 90°/s in a 1074 ms as a continuous movement with a 1480 ms move from first participant to last triggering the main stage alert. All participants were locked in place for 5700 ms triggering the additional stage alert and reporting the direction of auditory incident. Next, back movement was detected, and eyes were widened, and emotions were detected to be negative (surprise and fear) triggering the additional three stage alerts. Further, the sound volume increased by 93% triggering the last stage alert at 100%. The duration from stimulus until SHMOV reported the incident and direction of incident is 8.4 seconds. The system then created a second alert due to the second reaction towards the experimenter that shows similar results to Group B.

To reduce false positives depending on the environment the SHMOV system is deployed at and depending on the sensing capability the system relies on, the following parameters in some embodiments may be tweaked:

i. The number of heads synchronously aligned at a specific direction.

ii. The alignment difference acceptable range.

iii. The speed of degrees per second.

iv. If continuous move is required or angled move is also acceptable as seen in the olfactory and multiple stimuli groups.

v. The time from first move to pause for all people in frame.

vi. The duration of pause.

vii. The back movement during pause.

viii. The percentage of eye widen or clench.

ix. The magnitude of detected emotion.

x. The magnitude of sound deviation rate, and xi. Assigning a weight value for each of the above stage alerts.

The table below, summarizes the experiment results and the reported stage alert and time from incident to alert. The results support the main hypothesis that states that, "The synchronous head movement of the crowd as a human reactive behavior responding to a nearby incident in a locked geographic location and time presents is a valid metric for detecting out of frame incidents supporting the SHMOV system as a system capable of detecting out of frame incidents, with a fastest detection of an incident from start at 8.4 seconds.

| Group | A | B | C | D |
|---|---|---|---|---|
| Stimulus Type | Auditory | Visual | Olfactory | Both Auditory and Visual |
| Stimulus Source Direction | Left | Right | Spread (source right door) | Left and Right |
| % of subjects move to same direction | 100% | 100% | 60% | 100% |
| Degree Difference among participants | 20° | 20° | 30° | 20° |
| Avg. speed of movement and time | 80°/s in 1150 ms | 70°/s in 1410 ms | 50°/s in 1486 ms | 90°/s in 1074 ms |
| Continuous? | Yes | Yes for 3 and no for 2 Directed by two participants | Yes for 3 and no for 2 Directed by one participant | Yes for 5 towards sound and then Moved towards visual stimulus |
| 1st participant to last timer | 1400 ms | 4720 ms | 15450 ms (Omitted due to the nature of the stimulus being olfactory) | 1480 ms Auditory 4471 ms Visual |
| Avg. Pause time | 5240 ms | 8490 ms | 2404 ms | 5700 ms Auditory 9429 ms Visual |
| Back movement | Yes 4 out of 5 | Yes 3 out of 5 | No (No stage alert) | Yes (All) |
| Eyes behavior changed widened or clenched? | Yes (Widened) | Yes (Widened) | Yes (All) (Clenched) | Yes (Widened) |
| Emotion | Surprise (3) Fear (2) | Surprise (4) Fear (1) | Surprise (5) | Surprise (2) Fear (3) |
| Sound Amp. | 93% | 65% | 22% (No stage alert) | 93% Auditory 57% Visual |
| Incident Detected? | Yes | Yes | Yes | Yes Two alerts Auditory then Visual |
| Duration between incident and detection | 9 seconds | 24 seconds | 47 seconds | 8.4 seconds (Auditory) 28 seconds (Visual) |
| Stage Alert | 100% | 100% | 80% | 100% Auditory 100% Visual |

This application describes, in some embodiments, SHMOV, a security system that takes advantage of the sensing capabilities of humans and turn their senses into an indication of an incident even if it is outside of the video frame.

The system, in some embodiments, monitors the head movement of individuals by applying object detection to detect the head of all individuals in the frame using Convolutional Neural Network (CNN). The system may then compute the direction of everyone's head periodically and reports if the conditions in the SHMOV data process are true. The system may then initiate a main stage alert that is strengthen by detecting further cues such as remaining in a locked direction, a head back movement occurs, emotion, eyes behavior and any abnormal sound happens.

An example embodiment of the system has been evaluated in an experiment settings of 4 groups each is stimulated using a specific human sense capability namely, Auditory, Visual and Olfactory and showed the system capability in detecting each incident with a 100%, 100% and 80% accuracy in a speed of 9 seconds, 24 seconds and 47 seconds respectively.

Further embodiments of the system may include analyzing other crowd behavior responses based on human sensing capabilities to danger like crowd hand movement pointing to danger or an abnormal running happens in a locked period of time that depends on the sensing capability that is utilized and the environment where the system is deployed and the types of possible dangers that might take place. Other alternate embodiments may involve improving the head direction movement capability with a higher precision to reduce the false positives. The system can be applied in real world scenarios where heads of some individuals are covered and reporting how the covering impacts on the system accuracy and steps may be taken to mitigate these issues.

Figure 7:
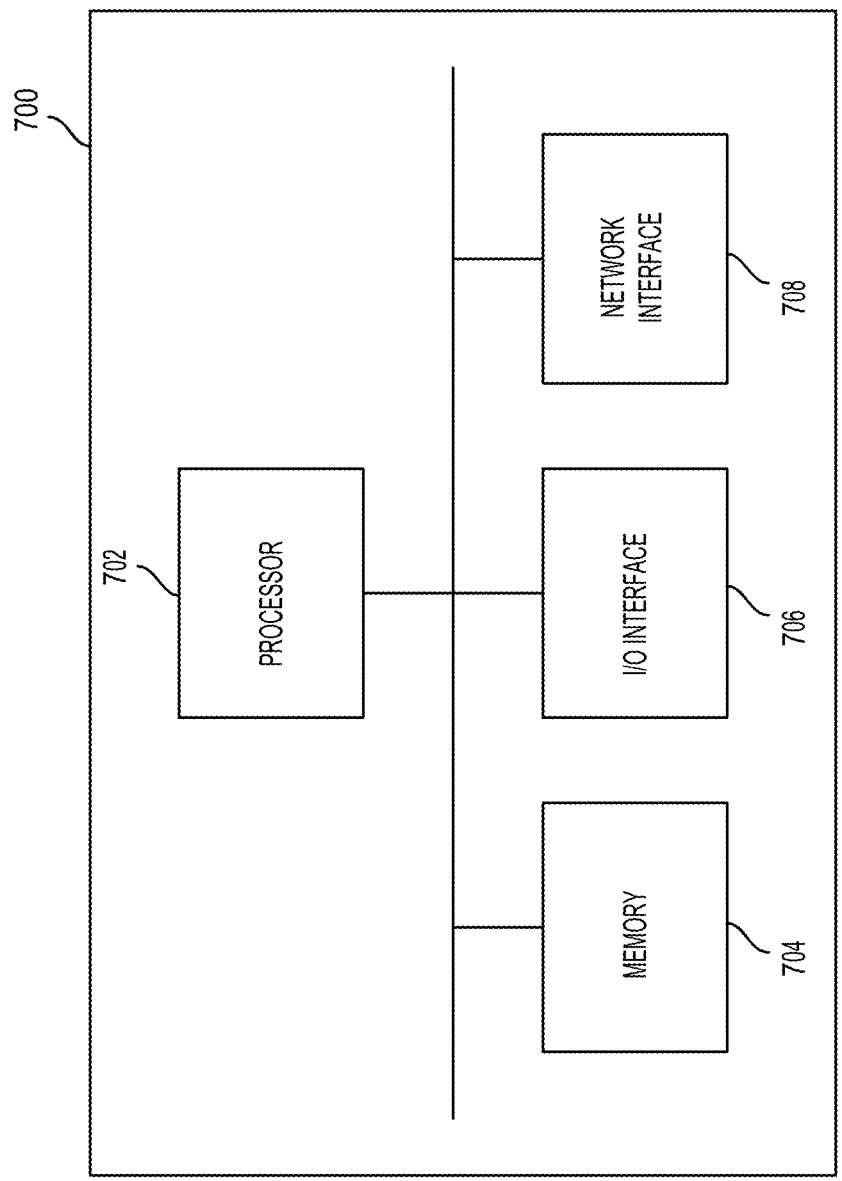
FIG. 7 is a schematic diagram of a computing device used to implement the example platform, according to some embodiments.

FIG. 7 is a schematic diagram of a computing device 700 such as a server. As depicted, the computing device includes at least one processor 702, memory 704, at least one I/O interface 706, and at least one network interface 708.

Processor 702 may be an Intel or AMD x86 or x64, PowerPC, ARM processor, or the like. Memory 704 may include a combination of computer memory that is located either internally or externally such as, for example, random-access memory (RAM), read-only memory (ROM), compact disc read-only memory (CDROM). Each I/O interface 706 enables computing device 700 to interconnect with one or more input devices, such as a keyboard, mouse, camera, touch screen and a microphone, or with one or more output devices such as a display screen and a speaker.

Each network interface 708 enables computing device 700 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g., Wi-Fi, WiMAX), SS7 signaling network, fixed line, local area network, wide area network, and others.

Computing device 700, in some embodiments, is a special purpose machine that may reside at a data center. The special purpose machine, for example, incorporates the features of the controller circuit 112 and is provided in a portable computing mechanism that, for example, may be placed into a data center as a rack server or rack server component that interoperates and interconnects with other devices, for example, across a network or a message bus, and configured to control one or more security cameras.

In another embodiment, computing device 700, is a special purpose integrated circuit that is adapted with limited instruction sets to be retrofit onto an existing camera control implementation to modify when the camera should be controlled to move in a particular direction.

The term "connected" or "coupled to" may include both direct coupling (in which two elements that are coupled to each other contact each other) and indirect coupling (in which at least one additional element is located between the two elements).

Although the embodiments have been described in detail, it should be understood that various changes, substitutions and alterations can be made herein without departing from the scope. Moreover, the scope of the present application is not intended to be limited to the particular embodiments of the process, machine, manufacture, composition of matter, means, methods and steps described in the specification.

As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the examples described above and illustrated are intended to be exemplary only.

What is claimed is:

1. A controller device controlling one or more orientations corresponding to one or more cameras, the controller device comprising:
    a processor coupled to a computer memory and non-transitory computer readable media, the processor configured to:
    process a plurality of image frames recorded by at least one camera of the one or more cameras to extract one or more head orientations corresponding to head objects identified for a plurality of individuals in the plurality of image frames over a first duration of time represented in the plurality of image frames;
    determine, from the one or more extracted head orientations, (i) an amount of synchronous alignment in the head objects in a new direction within a threshold range of angles, (ii) a rate of change in the one or more extracted head orientations towards the new direction, and (iii) a second duration of time in which re-orientation of the head objects begins and ends in the new direction; and
    responsive to the amount of synchronous alignment in the head objects in a new direction, the rate of change in the one or more extracted head orientations towards the new direction, and the second duration of time in which the re-orientation of the head objects begins and ends in the new direction, control an orientation of at least one camera of the one or more cameras to move from an initial field of view to an updated field of view in the new direction.

2. The controller device of claim 1, wherein the processor is configured to establish a main stage alert if: the amount of synchronous alignment in the head objects for at least 50% of the one or more head orientations synchronously align within the threshold range of 35% difference, the rate of change in the one or more extracted head orientations towards the new direction is over 45 degrees per second, the movement towards the new direction by the head objects is a continuous move without changing angles, the time for each head object movement is within 1500 ms, and an overall time for movement of all the aligned head objects is within 5000 ms.

3. The controller of device of claim 2, wherein the processor is configured to conduct a second detection step whereby the head objects are tracked to determine whether the synchronous alignment in the head objects is maintained for over 2000 ms, and upon a positive determination, generate a second stage alert, and wherein the main stage alert and the second stage alert are utilized in determining whether the control of an orientation of at least one camera of the one or more cameras to move the field of view should be triggered.

4. The controller device of claim 3, wherein the processor is configured to conduct a third detection step whereby the head objects are tracked to determine whether at least one of the synchronously aligned head objects are moved in a corresponding backwards direction during the 2000 ms, and if the corresponding backwards direction is observed, generate a third stage alert;
    wherein the third stage alert is also utilized in determining whether the control of an orientation of at least one camera of the one or more cameras to move the field of view should be triggered.

5. The controller device of claim 4, wherein the processor is configured to conduct a fourth detection step whereby the plurality of image frames are processed to identify one or more changes in eye shape objects or one or more changes in facial expression objects corresponding to the head objects, based on the changes in one or more changes in eye shape objects or the one or more changes in facial expression objects, generate an fourth stage alert;
    wherein the fourth stage alert is also utilized in determining whether the control of an orientation of at least one camera of the one or more cameras to move the field of view should be triggered.

6. The controller device of claim 5, wherein the processor is configured to conduct a fifth detection step whereby captured audio recordings are processed to identify one or more changes in audio amplitude and, based on the changes in the audio amplitude, generate an fifth stage alert;
    wherein the fifth stage alert is also utilized in determining whether the control of an orientation of at least one camera of the one or more cameras to move the field of view should be triggered.

7. The controller device of claim 6, wherein the one or more changes in audio amplitude are sensed from a coupled microphone adapted to capture sound characteristics prior to the main stage alert for a first duration of time, and to capture sound characteristics after to the main stage alert for a second duration of time, and wherein the fifth stage alert is generated when the sound characteristics during the second duration of time indicate an increase in 30% of sound amplitude relative to the first duration of time.

8. The controller device of claim 1, wherein moving the field of view corresponding to the at least one camera in the new direction includes controlling at least one of pan, tilt, or roll of the one or more cameras to in the new direction until a recognized incidence object is detected or centered within the field of view.

9. The controller device of claim 1, wherein the head objects are each associated with a geospatial coordinate and the one or more extracted head orientations are utilized to establish a corresponding vector from the head object towards the re-orientation of the head, and the new direction is established by extrapolating the corresponding vectors from the geospatial coordinates to an intersection point.

10. The controller device of claim 9, wherein the intersection point is utilized to determine the control of the orientation of at least one camera of the one or more cameras to move the field of view corresponding to the at least one camera in the new direction such that the field of view includes the intersection point.

11. The controller device of claim 1, wherein the one or more cameras includes a primary camera and a secondary camera that both cover the initial field of view, and the primary camera is adapted to move to cover the updated field of view in the new direction while the secondary camera is adapted to maintain coverage over the initial field of view.

12. The controller device of claim 11, wherein the processor is configured to, responsive to determining that there are two or more cameras that include the primary camera and the secondary camera, reduces a threshold requirement for controlling the orientation the primary camera to move to cover the updated field of view.

13. The controller device of claim 1, wherein the one or more extracted head orientations are represented in one or more corresponding data objects having coordinate representations indicating an estimated position of each of the head objects along with a direction vector corresponding to a rotation corresponding to each of the head objects, the data objects representing a transformed simplification of the plurality of image frames.

14. The controller device of claim 7, wherein the processor is configured to control the orientation of the at least one camera to move from the initial field of view to the updated field of view based on an increasing probability based on a number of stage alerts that have been generated.

15. The controller device of claim 7, wherein a number of stage alerts that have been generated is utilized to determine how long the at least one camera is maintained in the updated field of view before reverting to the initial field of view.

16. The controller device of claim 6, wherein the processor is configured to conduct a sixth detection step whereby the detected head objects are processed to identify one or more changes in facial features or eye sizes, based on the changes in the facial features or eye sizes, generate an sixth stage alert;

wherein the sixth stage alert is also utilized in determining whether the control of an orientation of at least one camera of the one or more cameras to move the field of view should be triggered.

17. The controller device of claim 9, wherein the corresponding vector from the head object towards the re-orientation of the head are expanded as corresponding cones having an angular spread from the head object based on a threshold degree of variance, and the intersection point is established by extrapolating the corresponding cones.

18. The controller device of claim 1, wherein the controller device is retrofit to a security system including the one or more cameras.

19. A computer implemented method for controlling one or more orientations corresponding to one or more cameras, the method comprising:

processing a plurality of image frames recorded by at least one camera of the one or more cameras to extract one or more head orientations corresponding to head objects identified for a plurality of individuals in the plurality of image frames over a first duration of time represented in the plurality of image frames;

determining, from the one or more extracted head orientations, (i) an amount of synchronous alignment in the head objects in a new direction within a threshold range of angles, (ii) a rate of change in the one or more extracted head orientations towards the new direction, and (iii) a second duration of time in which re-orientation of the head objects begins and ends in the new direction; and responsive to the amount of synchronous alignment in the head objects in a new direction, the rate of change in the one or more extracted head orientations towards the new direction, and the second duration of time in which the re-orientation of the head objects begins and ends in the new direction, controlling an orientation of at least one camera of the one or more cameras to move from an initial field of view to an updated field of view in the new direction.

20. A non-transitory computer readable medium storing machine interpretable instruction sets, which when executed by a processor, cause the processor to perform a computer implemented method for controlling one or more orientations corresponding to one or more cameras, the method comprising:

processing a plurality of image frames recorded by at least one camera of the one or more cameras to extract one or more head orientations corresponding to head objects identified for a plurality of individuals in the plurality of image frames over a first duration of time represented in the plurality of image frames;

determining, from the one or more extracted head orientations, (i) an amount of synchronous alignment in the head objects in a new direction within a threshold range of angles, (ii) a rate of change in the one or more extracted head orientations towards the new direction, and (iii) a second duration of time in which re-orientation of the head objects begins and ends in the new direction; and responsive to the amount of synchronous alignment in the head objects in a new direction, the rate of change in the one or more extracted head orientations towards the new direction, and the second duration of time in which the re-orientation of the head objects begins and ends in the new direction, controlling an orientation of at least one camera of the one or more cameras to move from an initial field of view to an updated field of view in the new direction.

\* \* \* \* \*